FIG. I.

INVENTOR.
LEONARD F. FROST

INVENTOR.
LEONARD F. FROST

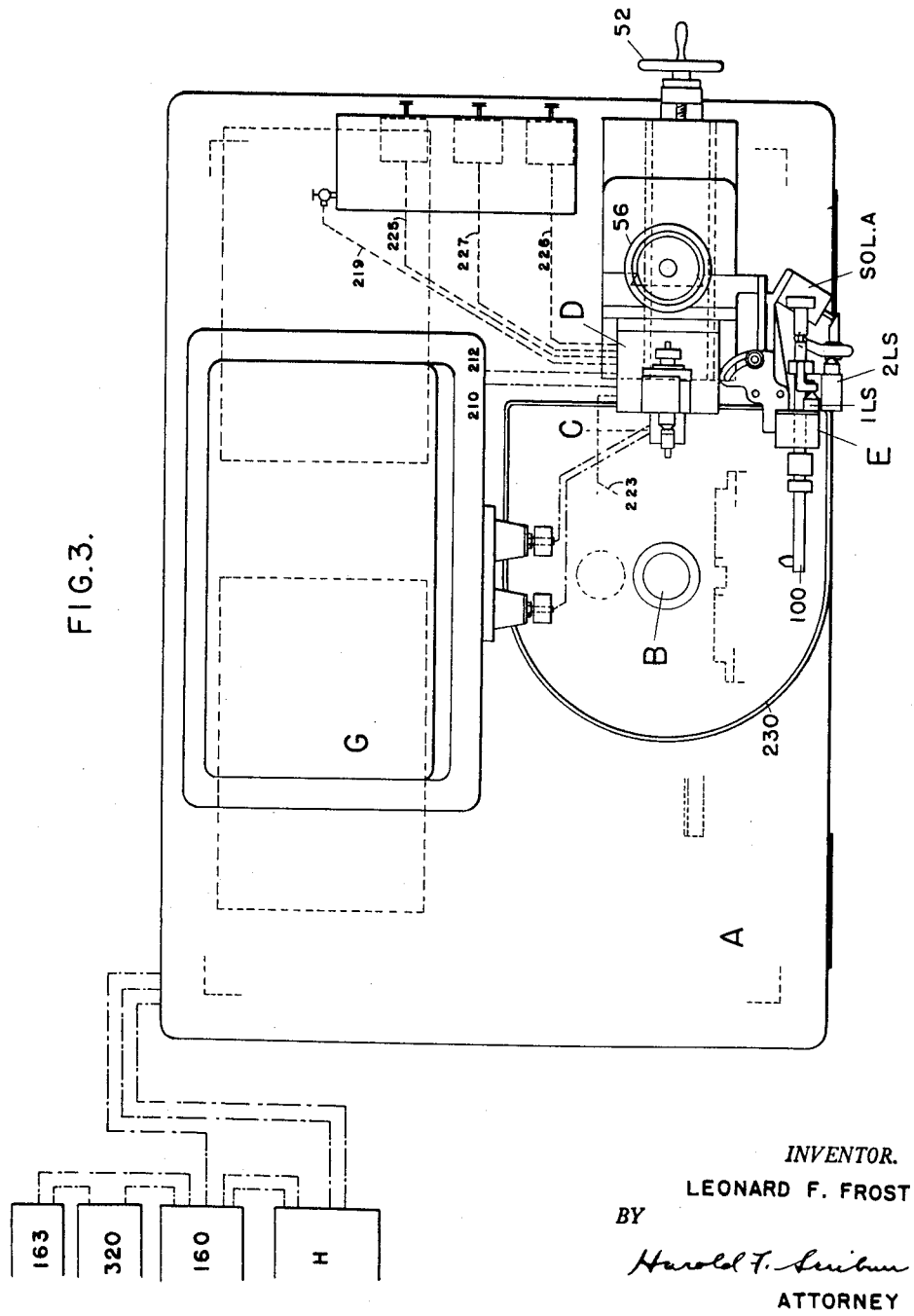

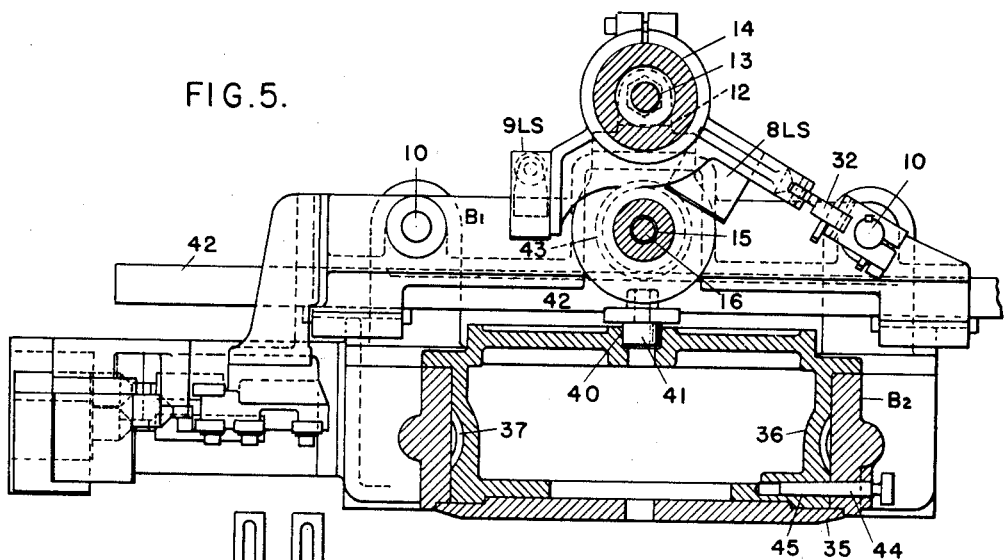
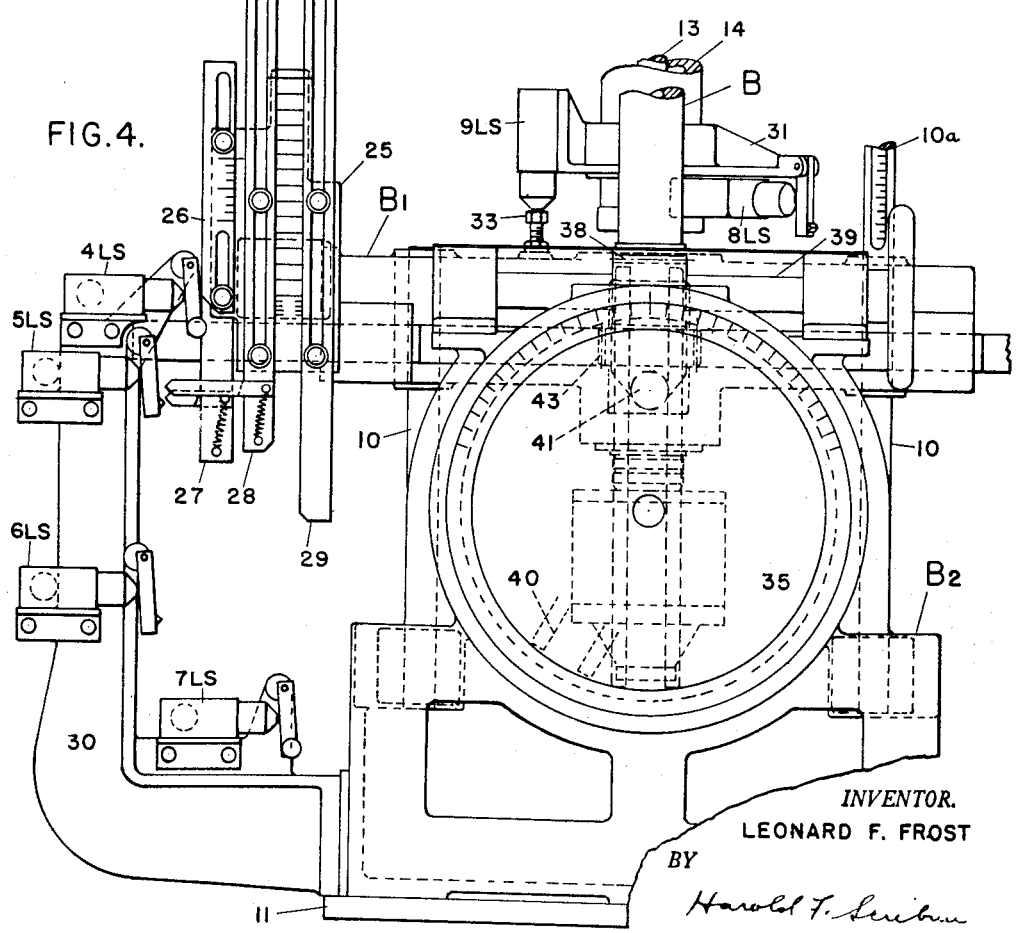

Nov. 1, 1960 L. F. FROST 2,958,619
METHOD AND APPARATUS FOR HEAT TREATING
TEETH OF GEARS AND THE LIKE
BY INDUCTION HEATING
Filed April 11, 1956 10 Sheets-Sheet 5
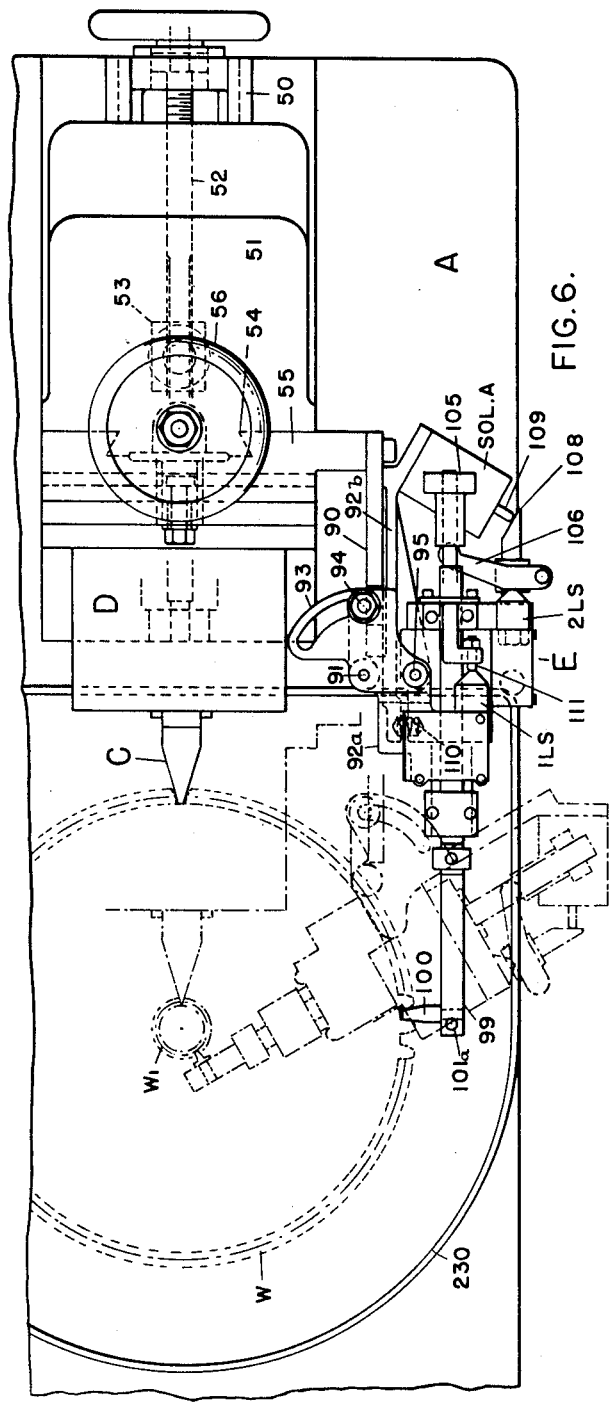
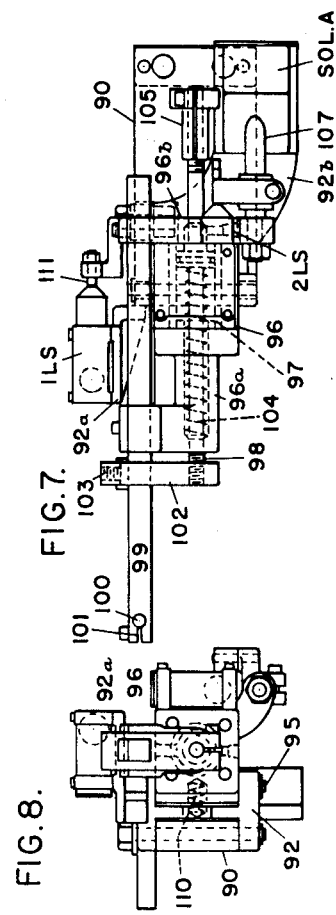
*INVENTOR.*
LEONARD F. FROST
BY
*Harold F. Scribner*
ATTORNEY

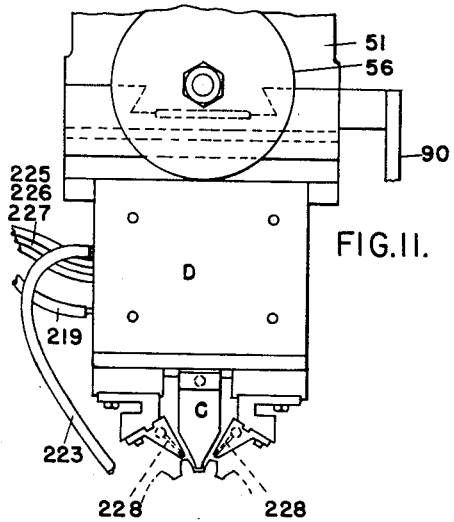
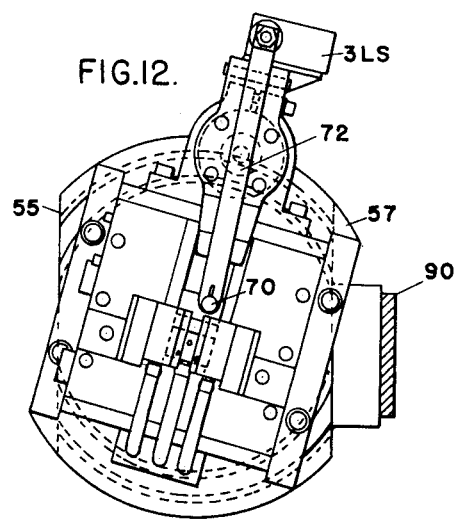
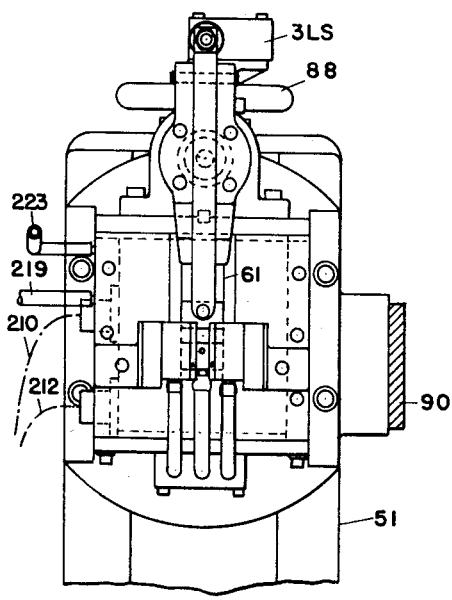
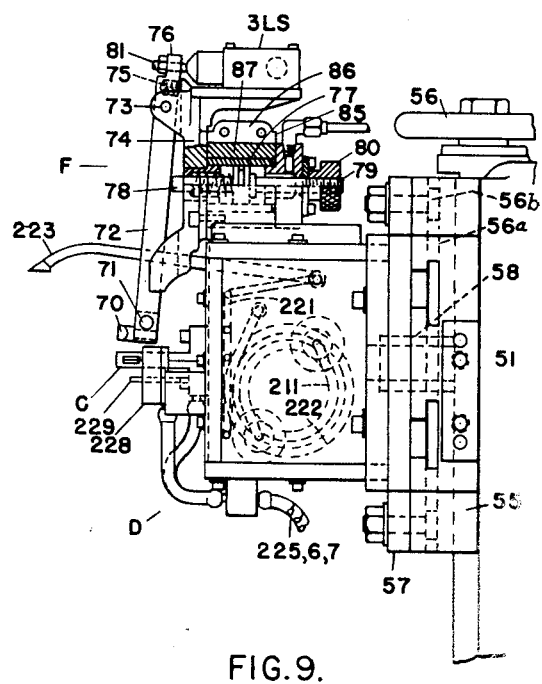

Nov. 1, 1960
L. F. FROST
2,958,619
METHOD AND APPARATUS FOR HEAT TREATING
TEETH OF GEARS AND THE LIKE
BY INDUCTION HEATING
Filed April 11, 1956
10 Sheets-Sheet 7
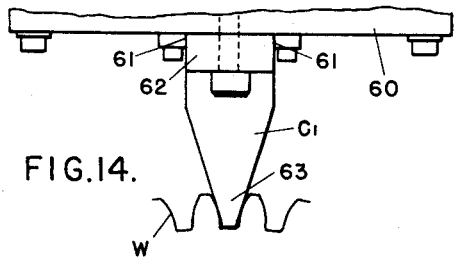
FIG.14.
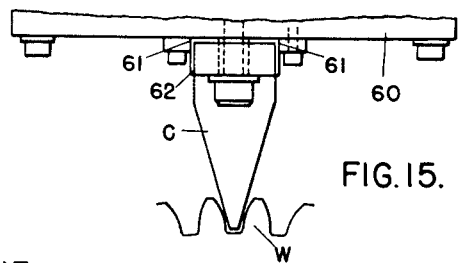
FIG.15.
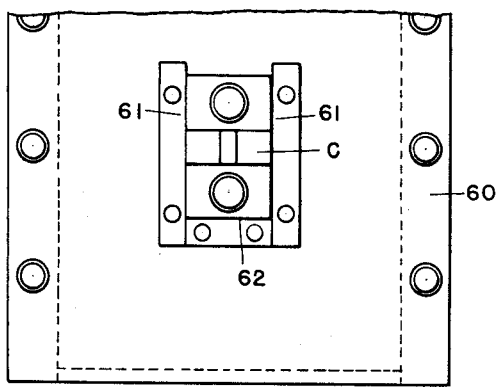
FIG.13.
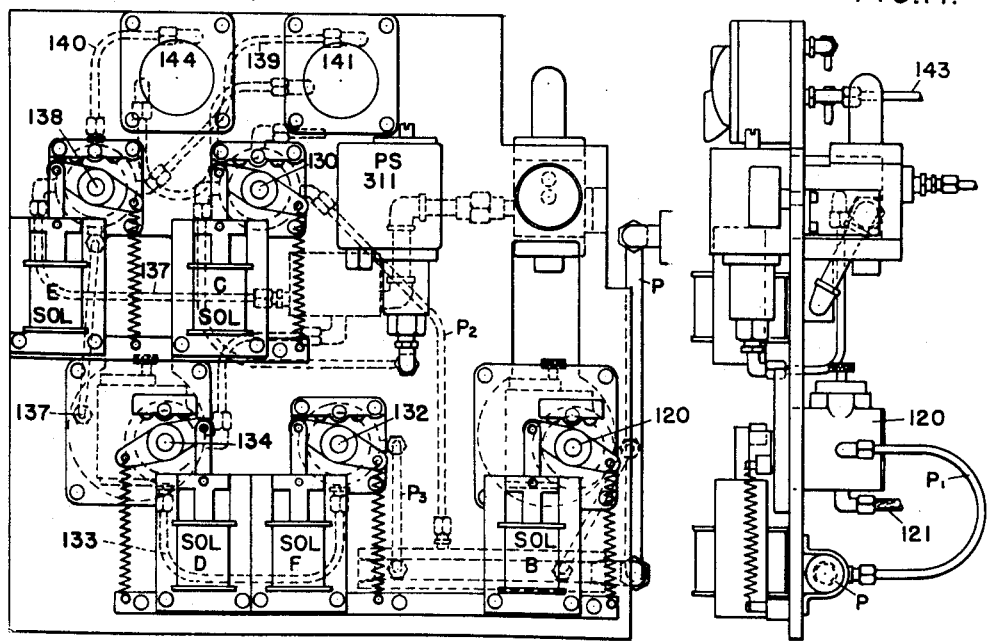
FIG.16.
FIG.17.
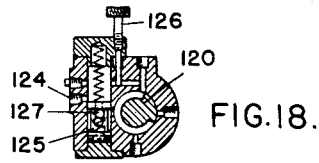
FIG.18.
INVENTOR.
LEONARD F. FROST
BY
Harold F. Sinken
ATTORNEY INVENTOR.
LEONARD F. FROST
BY
Harold F. Suchman
ATTORNEY Nov. 1, 1960
L. F. FROST
2,958,619
METHOD AND APPARATUS FOR HEAT TREATING
TEETH OF GEARS AND THE LIKE
BY INDUCTION HEATING
Filed April 11, 1956
10 Sheets-Sheet 9
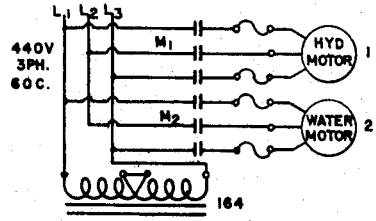
FIG.21.
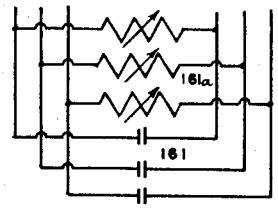
FIG.22.
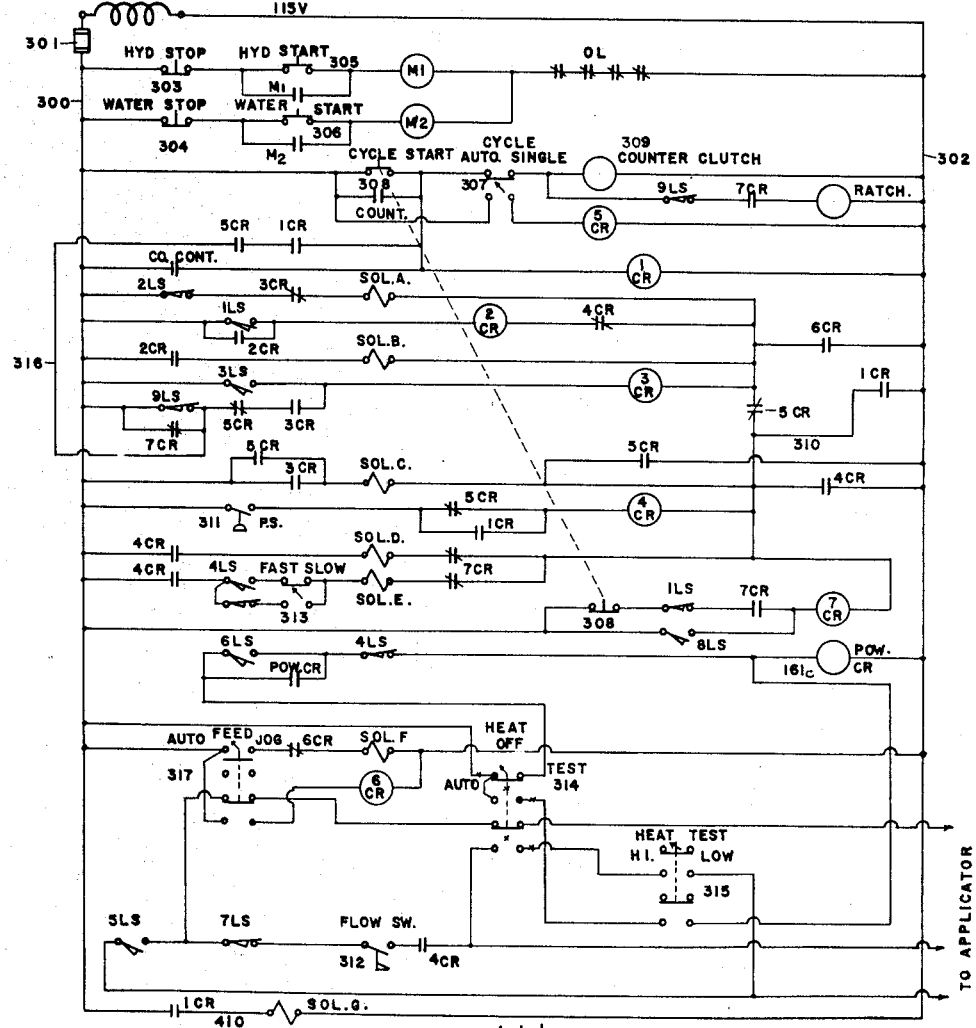
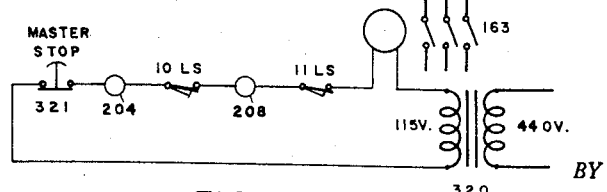
FIG.23.
*INVENTOR.*
LEONARD F. FROST
BY
Harold F. Scribner
ATTORNEY

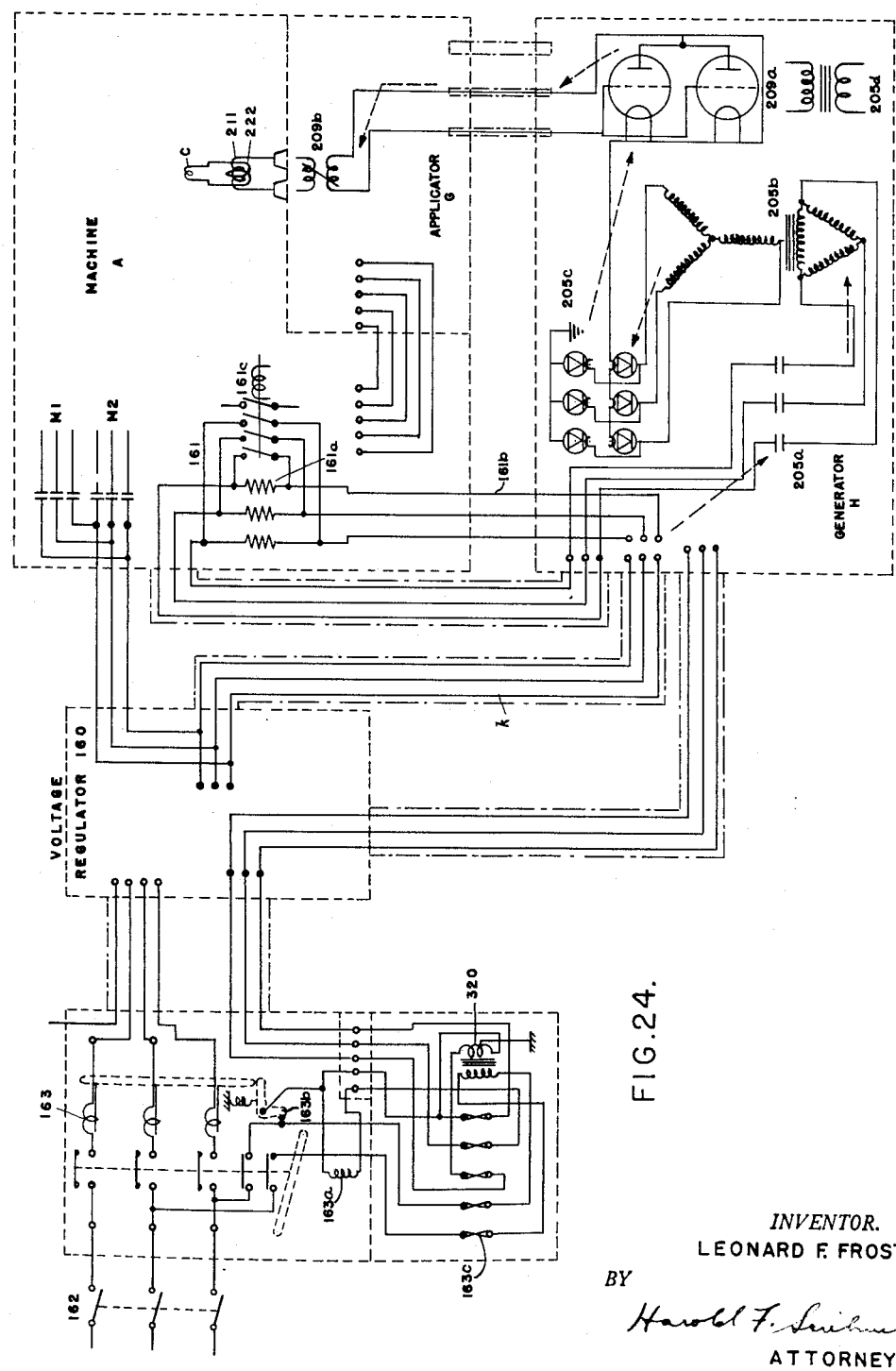

United States Patent Office 2,958,619
Patented Nov. 1, 1960

2,958,619

METHOD AND APPARATUS FOR HEAT TREATING TEETH OF GEARS AND THE LIKE BY INDUCTION HEATING

Leonard Frank Frost, Cheltenham, England, assignor to Delapena & Son Limited, Cheltenham, England Filed Apr. 11, 1956, Ser. No. 577,565

7 Claims. (Cl. 148—147)

The present invention relates to metal-working equipment and more particularly to methods and means for heating working surfaces of metal parts such as the teeth of gears and sprockets and the like by means of high-frequency induction heating. A primary aim of the invention is to harden the teeth of a toothed element efficiently and expeditiously and in such manner that undesirable stresses, i.e. tensile stresses in the surface distortion and/or deflection of the workpiece is avoided and for all practical purposes completely eliminated to the end of rendering subsequent grinding and correcting operations on the work unnecessary. The invention further aims to provide an improved method and means for quickly producing intense heat in the surface portions of the flanks and valleys of the toothed member and according to a preferred method, to cause a narrow band of intense heat to traverse the entire face width of the teeth and to produce therein a uniformly consistent hardness pattern.

According to this invention and the method and apparatus hereinafter to be explained more fully it is proposed to heat adjacent flanks of two teeth by high-frequency induction heating using an inductor element, conforming closely to the shape of the space between two teeth, capable of producing a relatively narrow band of heat in the work adjacent the center line of the periphery of the inductor, and a further aim of the invention is to render available conveniently operable means for ensuring that the desired spatial relation exists between the boundaries of the formed inductor and the surfaces of the work to be treated to the end of producing a heat pattern of uniformly constant depth in the flanks and in the valley between two teeth. Still a further object of the invention is to effect precision guiding of the inductor through the space between the teeth to be treated during the relative traverse movement between work and the inductor.

Another aim of the invention is to provide a simple and effective means for effecting cyclic operation of the heating process and between the operational cycles thereof to effect progressive and relative indexing of the work piece step-by-step without cumulative error until all of the teeth thereon have been heat-treated and hardened. By way of additional refinement the invention undertakes to effect the cyclic indexing tooth-by-tooth by improved means which is infinitely adjustable and inherently capable of performing precision indexing operations on or with respect to any size gear or work blank within the range for which a given machine is designed to handle.

Another objective of this invention is to provide improved means for effecting the aforesaid traversing movement between the inductor and the work at a controlled-constant or electively variable rate so that with a given power the heat pattern and the depth thereof may be held uniform along the lineal path of travel of the heat band by effecting the traverse movement at a constant rate, or a varied pattern to suit particular requirements such as the avoidance of overheated end portions of the teeth in the case of a straight-faced gear, or the assurance of proper heating of the end portions of the teeth of clashed-face shiftable gears, or the obtaining of proper heat in a surface whose spatial relation with the inductor may vary in a direction normal to the path of traverse of the inductor relative to that surface. The treating of crown-toothed gears may be mentioned as an example.

A further aim of the invention is the construction of an induction-heating gear-hardening machine embodying electively operable means for effecting relative movement between the inductor and the work either in a straight-line path as for spur-gear hardening, or in a helical path as for helical-gear hardening and to accomplish such movement with or without the aforementioned rate variation and in combination with automatic indexing and accurate locating of the tooth space with the inductor and positive guiding of the work and inductor during the heating and traversing operations.

The invention further aims to render available gear-hardening apparatus embodying in combination one or more of the above features together with means electively available and responsive to the traverse movement between the work and the inductor automatically to bring about a change in the flux intensity whereby and wherewith the heat pattern produced in the work may either be varied as to depth, held substantially uniform in such cases where the spatial relation or the gap between work and inductor may vary, or modified and controlled to suit the physical characteristics of the work from place-to-place along the path of travel of the band of heat. For convenience, this feature of the invention may be referred to as power-control means and which in combination with and in coaction with the means previously referred to for controlling rate of traverse, imparts to a hardening machine constructed in accordance with this invention a degree of flexibility and adaptability for a wide variety of toothed work.

This invention further aims to provide an induction-hardening machine organization which is fully automatic in its cycle of work-locating, heat-band traversing, work-quenching, return, and indexing and which is self-contained in that the systems provided for cooling the inductor and portions of the electrical power circuitry as well as the systems embodied for quenching the work are built-in, requiring only to be connected with service lines, such as water mains and drains and an electric-power source, to become fully operative. Still another aim of the invention is the provision of adequate safety means and interlocks operative to protect the operator or attendant assigned to the machine and also to prevent needless injury to workpieces and/or to the machine elements should there occur a failure in the power supply, service lines, or in the functioning of the machine elements or their necessary adjuncts and accessories.

A preferred form of hardening machine designed to carry out the objectives of this invention may conveniently comprise a generally rectangular base member in which a vertically arranged work-supporting spindle is journaled for axial reciprocation and when necessary angular oscillation by means housed within the base. The upper end of the work spindle is caused to project through the base and is surrounded by a catch basin for spent cooling and quenching fluids. The upper end of the spindle is provided with a work fixture upon which the gear or other workpiece is centered and periodically clamped in indexed position. The top of the base is advantageously provided with horizontally disposed guideways adapted to mount an upstanding column for movement toward or away from the axis of the work spindle in accordance with the size of the gear whose teeth are to be hardened. The front face of the column, i.e. the face toward the work spindle, is provided with vertically disposed guideways upon which a vertically movable inductor-work-head slide is mounted. The front face of the slide pivotally mounts a swivel plate which in turn is adapted to carry a housing containing an output transformer of the high-frequency circuit and its proximately located inductor. The forward face of the housing may be channel-milled or otherwise equipped with guide means for accurately and correspondingly locating interchangeable tooth-space-registering means and inductor-work-coil units. In carrying out the principles of the present invention, it is preferred to employ a work-coil or inductor that is energized by high-frequency current to produce a magnetic flux pattern which in turn induces electrical currents in the work and produces a heat pattern therein, and to arrange the inductor with the polar axis of the loop generally perpendicular to the plane of the surface to be heated. The ends of the polar axis of the loop conductor constitute the working faces of the inductor and it is at these ends where there is the greatest concentration of the lines of magnetic flux entering and leaving the circuit. By so constructing the inductor that its polar ends conform to the shape of the space between two teeth of the workpiece and are closely spaced but electrically insulated therefrom, the path of the flux concentration may be directed into the workpiece surfaces and the voltages induced therein, through losses generally referred to as eddy currents and hysteresis losses, to produce a heat pattern that is primarily a function of the spatial relation of the inductor to the work and of the current frequency. To ensure the production of equal heat patterns on the opposite flanks of the teeth to be treated, the invention proposes a simple means for obtaining precision registry of the workpiece with the inductor, which once obtained with respect to a gear of a given tooth size or pitch, is maintained throughout the hardening of the successively presented tooth flanks. As above indicated, registration and centralization of the inductor may be easily obtained by constructing a dummy inductor with a mounting base identical with the mounting base of the working inductor but otherwise dimensionally proportioned slightly larger than the working inductor, the difference in size being equivalent to the air gap desired between the working faces of the real inductor and the workpiece. When initially setting up the machine for hardening a gear of a certain pitch, the dummy inductor is mounted on the swivable transformer housing and the housing raised or lowered and adjusted forward until the dummy inductor fits into the space between and engages the flanks of two teeth of the work piece. Thereafter the dummy inductor is removed and the working inductor mounted in its place, the latter being dimensionally slightly smaller is caused to assume a position equally spaced therefrom. When the current is applied the substantially uniform air gap produced at both pole faces of the inductor and at the loop end thereof adjacent the trough surface causes symmetrical distribution of the flux.

Before current is applied, however, an index correcting means is brought into position and adjusted to engage preferably the same two tooth flanks and to establish that relative position for subsequent indexing and repeat cycles on the successive teeth. The indexing of the gear to bring successive teeth into operative position may be accomplished preferably by a hinged-mounted tangentially movable bar that is fitted with a lug adapted to engage between two teeth of the gear being operated upon. Solenoid-operated means and hydraulic means may be provided to cause the lug on the bar to latch to the gear and thereafter to shift tangentially to effect angular movement of the gear one position relative to the inductor. Means are also provided to adapt the indexing device to large or small diameter gears, and its stroke to gears of different pitches. By embodying an index-correcting device such as heretofore mentioned, the actual indexing movement, which may be effected hydraulically, need not be precision made for it is the subsequent function of the index corrector to advance or retract the gear and bring the teeth to the required precise location relative to the inductor on each operating cycle.

Should the gear to be treated be a spur gear, the index-correcting pin is aligned with the inductor whereby relative movement between the inductor and the tooth space in a direction axially of the gear causes the one to follow the other, whereas if a helical gear is to be hardened the inductor is swiveled about an axis normal to the plane of the gear until the inductor is aligned with the angle of helix of the teeth on the gear. Additionally the index-correcting pin, which is physically located above or below the inductor and therefore caused to engage the tooth space at one side of the inductor, is with a helical gear swung over a slight distance further so as to engage the space which at that point, owing to the curving of the teeth helically about the cylinder, is circumferentially a little ahead or behind a true diagonal. When the proper relations have been established the parts are clamped and perform repeat centralizing operations without further attention. Means are provided for correlating the machine elements to the various types of gears, and the structural features will be set forth in more detail hereinafter.

In the embodiment illustrated herein it is proposed to shift the gear to be treated past a stationary inductor, though the conditions may be reversed or the movement made relative. However, if a spur gear is to be treated, the work-supporting spindle is locked against rotation and shifted solely axially. If a helical gear is to be treated, the work-supporting spindle is given a combined rotary and axial movement. A preferred means for effecting the axial movement of the work spindle may comprise a piston-and-cylinder mechanism, one element of which connects with a crosshead member within which the spindle is rotatably journaled, and the other element to a relatively stationary part of the machine. A hydraulic system including a pump and solenoid-operated rate-control and direction-control valves may be provided to actuate the spindle-reciprocating power cylinder, work-clamping cylinder, and the work-indexing mechanism.

A cooling system is provided for quenching the work and for cooling portions of the electrical units, particularly the high-frequency inductor, the coils of the output transformer, and portions of the high-frequency current generating means. Advantageously this cooling system is divided into two portions; namely, a cooling portion and a work-quench portion, the latter portion including a reservoir, pump, selector and throttle valves, jets for applying the quenching medium to the heated work surfaces to harden the metal, and a catch basin that conducts the spent liquids to a common waste line.

A system of manually operable and automatically operable controls are provided to govern the operating cycle of the machine which comprises work-clamping, approach travel of the work toward the inductor, feed of the work at a constant or variable rate past the inductor, return movement of the work to its starting position, unclamping of the work, indexing and centralizing the work, and reclamping of the work for a repeat cycle. In the exemplified organization the various operations are largely under the control of and responsive to the movement of the work spindle and the indexing mechanism whose controls are related and interlocked to ensure sequential and harmonious coaction of the mechanical elements, fluid mediums, and electrical energy during a gear-hardening operation, with a complete shutoff following the hardening of the last tooth on the gear.

The hardening cycle is essentially the same for both spur- and helical-gear hardening except that in the latter instance the work spindle is given a controlled angular motion during its axial travel so as to cause the helical gear clamped thereto to twist as it moves past the relatively stationary inductor.

A preferred means for effecting angular movement of the work spindle may be by a sine-bar mechanism comprising a gear pinion mounted on the work spindle, a rack bar slidably mounted in the spindle crosshead in mesh with the pinion, and a follower roller mounted to the bar and adapted to track a guide groove formed in an angularly adjustable plate. If the groove in the plate is aligned with the spindle axis, the rack-bar follower roller travels idly in the groove and the spindle is locked against turning. But if the guide groove in the plate is positioned at an angle to the work-spindle axis, corresponding to the helix angle of the gear, the rack-bar follower roll is caused to shift laterally as the spindle moves axially and this lateral shift of the follower effects endwise movement of the rack bar and imparts corresponding angular movement to the work spindle. With a device of this kind, relatively low or relatively steeply pitched helical gears may be given the necessary angular movement or lead in either a forward or reverse direction according to the hand of the gear, merely by adjusting the rack-bar follower-roller guide the requisite angular amount. By utilizing a sine-bar mechanism of this character, expensive change gears or other costly mechanisms for imparting electively a controlled and positively straight-line or guided twist movement to the work are avoided.

The producing of the high-frequency current for induction heating of work surfaces may be effected in one of several known ways, i.e. motor-generator sets, spark-gap converters, and vacuum-tube oscillators. The present invention of high-speed band- or line-heating by induced currents concerns primarily the vacuum-tube type of generator and the means whereby it is made peculiarly adapted to this improved method and machine. The power supply may be any voltage or type of current found in a factory, however, by way of example, 440 v., 3-phase, 60-cycle service is brought into the machine which, after passing a main disconnect switch, is connected to one side of a circuit breaker. This circuit breaker is preferably of the type that is closed manually and maintained closed by an auxiliary circuit that includes all safety switches such as door switches, liquid-flow switches, and a master knock-off switch. Hence, if a door is left open, or the water flow is below a set minimum the circuit breaker switch even if closed manually, will not make contact nor stay closed.

From the automatic circuit breaker the 440 v. supply is connected to a voltage regulator adapted to maintain the supply voltage to the induction-heater and gear-hardening machine substantially constant. A constant-value supply voltage is essential if one desires to reproduce consistent hardess depth and pattern on gear teeth or similar profiles. Without such a regulator, a variation in the line voltage incident to starting other apparatus for example, will cause a critical variation in high-frequency output and a corresponding variation in the heat pattern produced in the work. The voltage regulator here referred to is automatic in operation, such as one which includes a motor-driven tap-changer controlled by a voltage-sensitive relay that responds to an increase or decrease in the line voltage.

The regulated output voltage is then led to a generator section which steps up the voltage from 440 v. A.C. to 2800 v. A.C. between phases and then converts it to 6500 v. D.C. by means of a full-wave bridge-rectifier circuit. The regulated 440 v. A.C. supply voltage is, however, first fed through lines to a power switch having a set of switch contacts and a set of normally variable resistors shunt connected and thence to a contactor in the generator section. If the power switch is closed high voltage service is connected with the primary of a main high-voltage transformer but if the power switch is open the resistances are effective and a lower voltage is supplied to the transformer. The power switch is arranged so that it may be operated to opened or closed position during a traversing operation of the work so that when desired the power requirements may be varied during a hardening cycle. The transformer in the generator steps up the voltage from 440 v. A.C. to 2800 v. A.C. between phases after which it is rectified by mercury-vapor tubes to 6500 v. D.C. This high-voltage current is then supplied to water-cooled oscillator tubes which together with a variable inductance having primary and secondary coils form part of the oscillatory circuit. By varying the mutual coupling of the coils, the power may be increased or decreased. However, to suit the impedance of the work coil, herein referred to as the intensifier, and to make it possible for the intensifier to absorb the R-F power, another R-F transformer is mounted adjacent the intensifier in the output of the oscillatory circuit to reduce the voltage and increase the current.

The voltage regulator supplies current to the several pump motors and also through a step-down transformer supplies 115 v. A.C. to operate the various relays and solenoids of the control circuits. The auxiliary circuits in the generator and applicator units are operated on 115 v. A.C. supplied by an auxiliary transformer in the generator unit. A master knock-off switch is provided at a convenient location on the machine and this switch in addition to safety switches, door switches, etc., govern the action of the main circuit breaker. The safety circuit receives reduced voltage current from the main service lines ahead of the circuit breaker by means of an additional transformer and is therefore always available. The electrical circuits and controls will be described in greater detail in connection with the following description of the mechanical features and operational cycle of the machine.

Other objects and advantages will be in part indicated in the following description and in part rendered apparent therefrom in connection with the annexed drawings.

To enable others skilled in the art to fully comprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 1 of the drawings is a front elevation of a gear-tooth induction hardening machine embodying the invention, the inductor and work-indexing and tooth-centering means being shown in an extreme upward position on the column and out of normal operating position in relation to the position of the gear to be treated.

Figs. 2 and 3 are respectively an end elevation and a plan view of the machine shown in Fig. 1, including generator, etc.

Figs. 4 and 5 are enlarged front and plan views of portions of the work-supporting spindle and its actuating means with portions of the cycle-controlling trip mechanisms associated therewith.

Fig. 6 is an enlarged plan view of a portion of the machine more clearly illustrating parts of a preferred form of work-indexing mechanism in normal positions in relation to gears of different sizes.

Figs. 7 and 8 are respectively front and end views of the work-indexing arm and its associated mechanism.

Fig. 9 is a detail view of a swivable inductor-head mounting with its related work-locator and indexing-corrector mechanism.

Fig. 10 is a view of the parts shown in Fig. 9 from the work-spindle axis of the inductor head.

Fig. 11 is a plan view of the inductor head with the work-locator removed to illustrate more clearly the inductor and quench jets.

Fig. 12 is a view similar to Fig. 10 but illustrating the inductor head swung over to a position suitable for a helical gear.

Fig. 13 is an elevational view of a portion of the swivel housing illustrating one form of guide means for securing accurate registration of the working inductor.

Figs. 14 and 15 are plan views of correspondingly mounted dummy inductor and working inductor, respectively.

Fig. 16 is a face view of a hydraulic panel illustrating the several valves and their actuating means employed in the hydraulic systems.

Fig. 17 is an edge view of the panel shown in Fig. 16.

Fig. 18 is a sectional view of a time-delay valve.

Figs. 21, 22, and 23 are schematic diagrams, respectively, of a preferred form of low-voltage cycle-control circuit, the power-control switch, and a small portion of the master knock-out switch provided in the R-F generator control circuit.

Fig. 24 is a block diagram of the relation of the electrical units required to produce the high-frequency current for induction heating.

Figure 1:
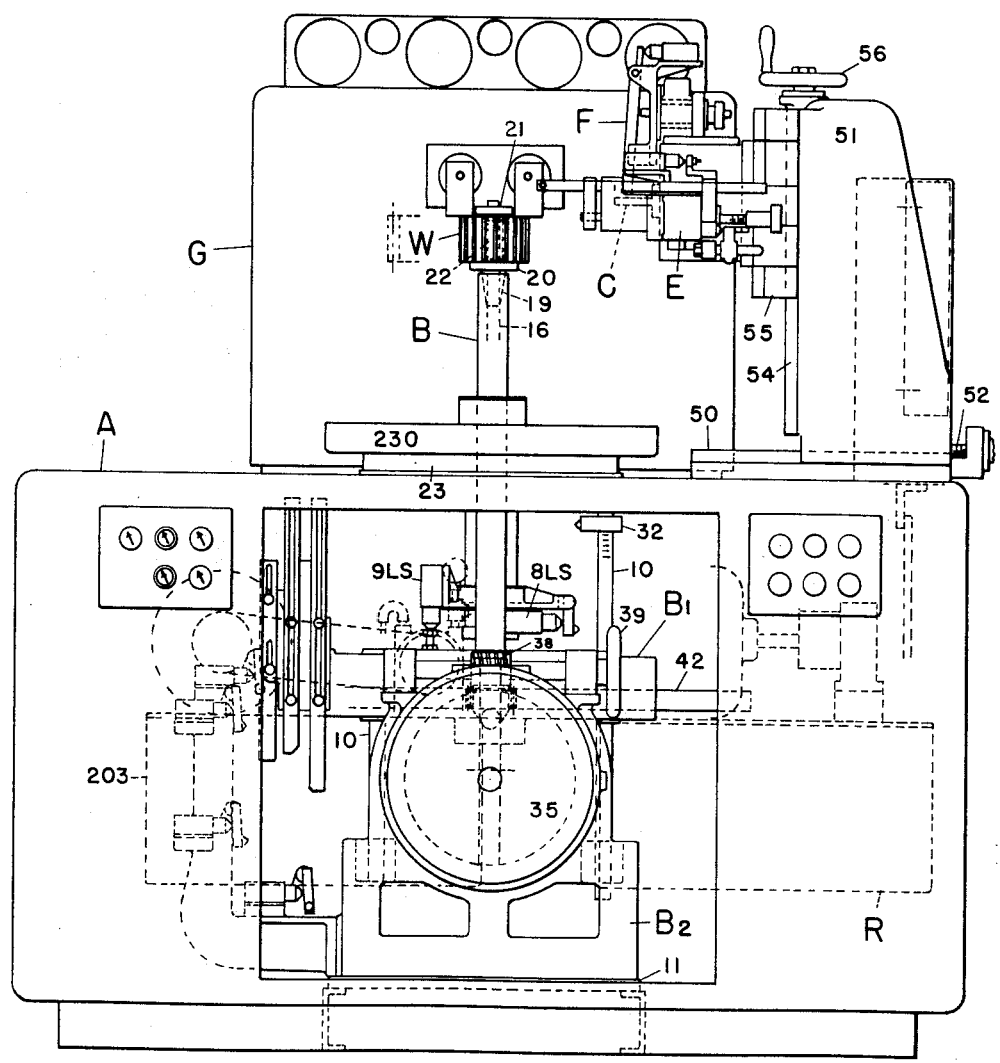
Figure 2:
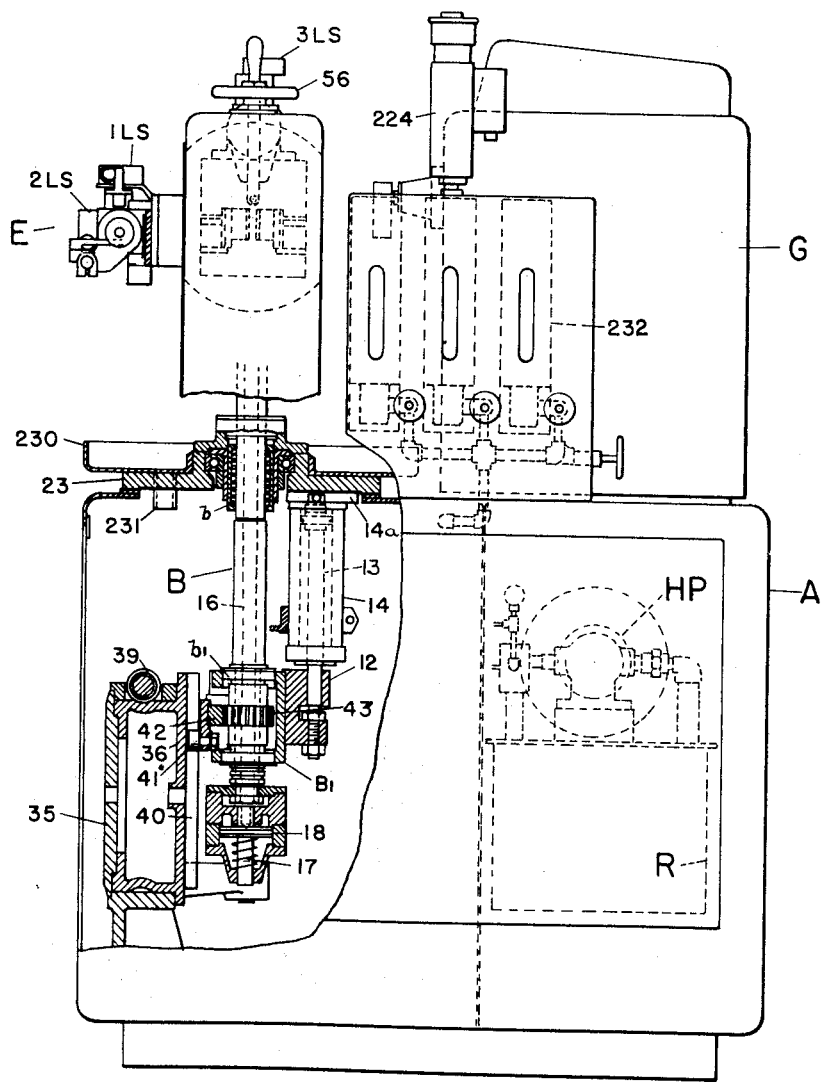

Referring more particularly to Figs. 1, 2, and 3, the induction-heating machine illustrated comprises a number of assemblies cooperatively related so as to perform a hardening operation on the teeth of a gear. A relatively large base unit A, closed on four sides except for access doors and panels, provides a main support and housing. A reciprocable and angularly movable work-spindle assembly B is journaled in the base on a vertical axis and its upper end equipped with a suitable fixture upon which the workpiece W may be centered, cyclically indexed, cyclically located, and cyclically clamped.

The induction-heater element C is detachably mounted to the face of a swivel-mounted head D opposite the work to be hardened. The swivable head D, in turn, is mounted to a vertically adjustable slide that is carried upon a supporting column and the latter is radially adjustable with relation to the work axis along the top of the base A. The work-indexing unit is indicated at E and the work-index corrector and locator is indicated at F. The letter G denotes a portion of the induction heating machine, more specifically the tank circuit, also referred to as the applicator, which receives high-voltage high-frequency pulsating current from a generator H which if desired may be located away from the machine. The applicator unit G is electrically connected by water-cooled flexible leads to the induction-heater element C.

Work spindle (Figs. 1, 2, 4, and 5)

The work spindle B is mounted for vertical reciprocation and angular oscillation in suitable bearings $b$, $b_1$ provided in part by the main base A and in part by a vertically movable spindle crosshead B1 located within the base. The crosshead comprises a frame-like structure that is guided by means of a pair of spaced-apart parallel rods 10 whose lower ends are guided in bearings provided in a supplementary frame member B2. The frame member B2 is fixedly mounted to a floor portion 11 of the main base. The spindle crosshead is formed with a projecting portion 12 adjacent the spindle bearing $b_1$ to which the piston rod 13 of a power cylinder 14 is connected and by which the spindle crosshead B1 is translated.

The flanged upper end 14a of the power cylinder is secured to the main base, as for example to the underside of a drain basin support 23 that also provides bearing means for the work spindle.

As indicated more clearly in Figs. 1, 2, and 5, the work spindle is formed with an axially extending bore 15 that receives a drawbolt shaft 16. The lower end of the drawbolt 16 may be threaded or otherwise fashioned for convenient attachment to the piston 17 of a work-clamping cylinder 18 coaxially aligned. The upper end of the work spindle is recessed as by a tapered socket 19 to receive the standardized end of the work fixture 20 and through which the drawbolt 16 may project. In the instant exemplification the drawbolt 16 is annularly grooved at its upper end to receive a removable U-collar 21 adapted to overlay the workpiece. In this instance the work fixture 20 is formed with a central hub or extension 22 upon which the gear to be treated is mounted and centered. When such a gear is mounted upon the fixture and the U-collar applied, downward movement of the drawbolt 16 effects firm clamping of the gear to its fixture and the fixture to the spindle. Upward movement of the drawbolt releases the clamping pressure and the gear may be indexed freely about the spindle axis. It will be understood that the work fixture 20 is representative and that the fixture employed in a given case will be constructed to suit the structural configuration of the work and the only requirements being that the work be accurately centered thereby and capable of being firmly clamped during the hardening cycle and thereafter released for indexing to the next position.

Vertical translation of the work spindle is effected hydraulically by admitting fluid under pressure to the power cylinder 14. Similarly, fluid under pressure is cyclically admitted to the work-clamping cylinder 18 to effect sequential operation of the work-clamping means. The hydraulic system provided for these purposes is disclosed diagrammatically in Fig. 19 which will later be described more fully. However, for the present it will suffice to explain that the various valves employed in the systems are solenoid-actuated and their control circuits related and arranged to respond to the vertical movements of the work spindle B. Thus, if the work-spindle movement is relatively fast or relatively slow the succeeding function of the machine is not initiated until the spindle, or which is more important, the work carried thereby, reaches a predetermined position. To control spindle movements the crosshead B1 is constructed to carry a laterally projecting latch plate 25 to which a plurality of adjustable trip dogs 26, 27, 28, and 29 are mounted in planes preferably offset from one another. An L-shaped bracket 30 secured to the stationary auxiliary frame B2 provides a support for cooperating limit switches 4LS, 5LS, 6LS, and 7LS in the control circuits. Similarly the power cylinder 14 carries a bracket 31 that provides support for limit switches 8LS and 9LS that also respond to movements of the spindle crosshead. The crosshead-guide rod 10a is extended upwardly so as to provide a mounting for an adjustable trip dog 32 positioned to actuate the limit switch 8LS, whereas an abutment screw 33 carried by the crosshead is positioned to actuate switch 9LS.

The functions of the switches just mentioned are as follows:

4LS, actuated by trip bar 26, controls the point of the change in speed of spindle travel downward.

5LS, actuated by trip bar 27, controls the point of switching on of the R-F current.

6LS, actuated by trip bar 28, controls the point of change in the power of the R-F current, should the operating cycle require a change in the power.

7LS, actuated by trip bar 29, controls the turn-off point of the R-F current.

8LS, actuated by trip dog 32, controls the point of reversal in direction of spindle travel.

9LS, actuated by the abutment screw 33 on the crosshead B1, initiates the work-index cycle at the end of the reverse movement of the spindle.

The several circuits and instrumentalities dominated by the movements of the work spindle will be further explained in connection with the control diagrams Figs. 19 to 24, inclusive.

*Work-twisting means (Figs. 1, 2, 4, and 5)*

When the nature of the work requires rotational oscillatory motion as well as linear reciprocatory motion relative to the inductor, it is proposed to employ a sine-bar mechanism or equivalent device for effecting the oscillatory movement. One form of such a mechanism is illustrated in Figs. 1, 2, 4, and 5, and comprises essentially a graduated dial plate 35 that functions as a cover and retainer for an angularly adjustable drum member 36. The drum is journaled in the the auxiliary frame B2 for adjustment about a horizontal axis that intersects the work-spindle axis, and its outer periphery is formed with gear teeth 37 that are meshed by a worm 38 on a handwheel-adjusted shaft 39. The back face of the drum 36 carries parallel guides 40 for a follower roll 41 that is carried by a laterally movable rack bar 42. The rack bar is journaled for endwise movement in bearings provided in the crosshead B1 so that the teeth 42 thereof mesh with a pinion 43 that is mounted upon the work spindle B and keyed thereto. When the guides 40 of the drum are in a vertical position paralleling the work-spindle axis, reciprocatory movement of the spindle crosshead causes the follower roll to move in the vertical path defined by the guides 40. However, when the guides 40 have been adjusted angularly to a position such as indicated in dotted lines in Fig. 4, vertical movement of the work-spindle crosshead causes the follower roll to shift simultaneously laterally and this lateral shift of the follower and its associated rack bar 42 imparts forward and reverse rotary oscillatory motion to the work spindle through the rack pinion 43. Such a sine-bar device provides, it will be seen, not only extremely accurate spindle movements but a positive guiding of the spindle in both directions. Moreover, it is extremely simple in its construction, setting, and operation, and avoids need for complex change-gear mechanisms and their attendant disadvantages.

Zeroing of the dial plate 35 and drum-carried guides 40 is conveniently effected by providing a tapered lock pin 44 (Fig. 5) adapted to be inserted in registering holes 45 provided in the drum 36 and the auxiliary frame B2. For frequently used settings several holes may be provided in the drum located to produce matching helical lead movement to the teeth of the work that may be clamped at the upper end of the spindle.

*Tooth-space precision locating
(Figs. 1 and 6 to 15, inclusive)*

A preferred form of means for initially establishing and thereafter repeatedly maintaining correct spatial relation between the inductor C and the flanks of successive pairs of teeth is illustrated in Figs. 1 and 6 to 15, inclusive. As illustrated in Fig. 1, the main base A is provided with parallel guides 50 that radiate from the axis of the work spindle B and upon which an upstanding column 51 is mounted for adjustment toward and away from the work axis. A rotatable but nontranslatable hand screw 52 and a coacting column-carried nut 53 are provided to effect the adjustment. The forward face of the column 51 is also provided with vertical guides 54 upon which an adjustable slide 55 is mounted. A similar hand screw and nut mechanism indicated at 56 is provided to effect vertical adjustment of the slide 55. The front of the vertically adjustable slide is finished and annularly grooved to provide head-anchoring T-slots 56a which, through the medium of conventional T-bolts 56b, a swivel-head adapter plate 57 is clamped in a selected angularly adjusted position. The swivel plate 57 is centered on a bushing 58 to swing about a horizontal axis intersecting the work-spindle axis, and serves as a mounting on which the water-cooled head D is located and secured.

The housing 60 is, in turn, provided with locating means, herein illustrated as parallel guides 61 between which the induction-heating element C is located and secured. As previously explained the heating element or inductor C, preferably the transverse-flux type, produces a high concentration of flux at its polar ends. In accordance with this invention the polar axis of the inductor is caused to extend generally perpendicularly to the flank surfaces to be treated and its shape conforms generally to the shape of the space between the two teeth. For best results and to obtain consistently uniform hardness patterns on all teeth of a gear, precision spacing of the inductor from the surfaces to be treated is essential and to achieve that end the invention proposes employing what may be termed a "dummy" inductor to attain the initial precision centralization. According to the method herein proposed, the dummy inductor and the real inductor are constructed with mounting bases identical in every respect so as to be interchangeably mounted on the housing 60. That portion of the dummy inductor that projects into the tooth space of the work is however constructed slightly larger in outline than the real inductor by an amount that equals the air gap desired between the real inductor and the flanks of the teeth. In Figs. 14 and 15 the letter C indicates the real inductor and C1 the dummy inductor, and both being provided with identical mounting bases 62 adapted to fit the locating means 61 of the housing 60 and to be interchangeably mounted thereon. The nose portion 63 of the dummy inductor is slightly larger in outline than the working inductor and when mounted upon the housing 60 and the latter adjusted vertically and horizontally by means of the hand screws 56 and 52 to position the dummy in the plane of the gear and in abutting relation with the flanking surfaces defining a tooth space, the subsequent substitution of the real inductor automatically produces the essential clearance gap required around the margins thereof. During the initial positioning of the dummy inductor in engagement with the gear, the gear remains unclamped from the spindle and is free to center itself with relation to the dummy after which it may be clamped by the operation of the clamp cylinder 18.

Having once established the correct location of the dummy inductor to the gear and the position of the gear to the dummy, in the manner explained, the re-establishment of that relation on successively indexed tooth spaces is obtained by means of the index-correcting device F. It will be understood that in setting up the machine and after the gear has been located by the dummy inductor, the index-correcting device F is set before the dummy inductor is removed. This device comprises preferably a tapered pin 70 that is normally clamped, as at 71 in a pivoted arm 72. The arm 72 is pivoted at its upper end at 73, in an adjustable bracket 74 mounted on the housing 60. Normally the bracket 74 is positioned so that the locating pin 70 lies close to and directly over the inductor C and in effect constitutes a vertical projection thereof. The pivotal mounting of the arm 72 permits the arm and the locating pin 70 to swing radially into and out of the tooth space that is occupied by the inductor. Spring means 75, acting between the arm extension 76 and the normally fixed bracket 74, tends normally to retract the locating pin from the tooth space, and a hydraulic cylinder 77 positioned behind the arm is provided to effect movement of the locating pin toward the gear and into the tooth space. The locating pin 70 is dimensionally the size of the tooth space and is adapted, when effective, to engage both flanks and hold the relative position previously established by the dummy inductor. When the locating pin 70 is withdrawn from the space, the gear may be indexed on the work spindle to the approximate next position and upon energization of the power cylinder 77 the locating pin 70 is advanced and accurately centralizes the gear with respect to the inductor before the reclamping of gear to spindle takes place. The power cylinder 77 includes a spring-retracted plunger 78 positioned to engage the pin-carrying arm 72, and a threaded extension 79 upon which an adjustable stop colar 80 is mounted. Fluid under pressure is cyclically admitted to the power cylinder 77, as will later be explained, and is cyclically cut off by means of a limit switch 3LS which responds to movement of the locating-pin carrying arm 72 to its tooth-locating position. Fig. 9 illustrates the mounting of the limit switch 3LS on the adjustable bracket 74, with its actuating button positioned to be engaged by an adjustable screw 81 that is carried by the index-locating-lever extension 76.

*Tooth locating on helicals*

The index-correcting and tooth-locating mechanism described above have to do primarily with the method and functioning of the apparatus when hardening spur gears whose teeth parallel the axis. When, however, the machine is to be used to harden helical gears whose teeth progress in the form of a helix about a cylinder, the inductor-head assembly D is unclamped from the slide 55 and swung angularly about the axis of the centralizing bushing 58 until the polar axis of the inductor C lies normal to the slant of the tooth flanks. In other words, the inductor head D is swung over to the right or to the left, according to the hand of the gear, an angular distance from zero position that corresponds with the helix angle of the helical gear. Furthermore, and inasmuch as the teeth of the helical gear follow a curved path about the blank, the zeroing pin 70 must be given a further adjustment laterally relative to the inductor C to compensate for the axial displacement of the pin from the inductor and the tooth curvature. Accordingly it is convenient to construct the locating-pin bracket 74 and the lever-actuating cylinder 77 as a single entity or as two parts joined together, and to swivel mount the assembly in a bracket 85 that in turn is mounted on the inductor-head housing 60. As shown in Figs. 9 and 10, the mounting bracket 85 may be in the form of a cylindrical shell split, as at 86, along one side. A complementary cylindrical jacketing portion 87 surrounding the power cylinder 77 and which carries the bracket 74 is fitted within the mounting bracket 85 and may be clamped therein by tightening clamp screws 88 that engage opposite sides of the split portion of the mounting bracket. In setting the machine for hardening the teeth of helical gears, the inductor head D is swung over and a dummy inductor employed to establish the initial zeroing of the space and the air gap as previously explained. During this operation the locating pin 70 is unclamped from its arm 72 so as to be free to turn, and the bracket assembly 74 unclamped so that it may be conveniently adjusted. With the locating pin 70 and bracket 74 loosely held in their respective mountings either or both may be hand-adjusted until the locating pin properly seats in the tooth space. After the proper relations have been established, the pin and bracket are reclamped and the dummy inductor removed. Thus, the relative position of the gear teeth to the real inductor may be re-established automatically on successive operational cycles.

*Rough indexing mechanism (Figs. 1 and 6 to 8, inclusive)*

In Figs. 6 to 8 a preferred form of rough-indexing mechanism is disclosed on an enlarged scale and which includes essentially a rectilinearly movable bar 99 having a lug 100 at its end adapted to be brought into engagement with the teeth of a gear and then moved tangentially so as to advance the gear to the next station, usually one tooth, for treatment. The indexing mechanism comprises an assembly E that is mounted at the side of the vertically movable slide 55 and substantially independently of the swivel mounting of the inductor-head assembly D. The mechanism includes a main support 90 that is bolted secure to a pad at the side of the slide 55 and which carries at its outer end a hinge pivot 91 about which a normally fixed but angularly adjustable intermediate bracket 92 pivots. An arcuately slotted extension 93 of the bracket and a coacting clamp screw 94 which threads into the main support 90, provide convenient means for anchoring the intermediate bracket in adjusted position. A forward extension 92a of the intermediate bracket 92 provides a shelf-like support for a limit switch 1LS and a rearward extension 92b is constructed to provide a support for an electrically operated solenoid A, whose circuitry and functions will be explained later.

The intermediate support also provides a pivot point, at 95, for a relatively movable housing and guide bracket 96. The housing is bored out horizontally to receive a power cylinder 97 and its cooperating piston element 98. The end caps 96a and 96b of the cylinder extend upwardly at opposite sides of the pivot point 95 and provide aligned guides for the rectilinearly movable bar 99 and the gear-tooth-engaging lug 100 carried thereby. The tooth-engaging lug 100 is constructed preferably wedge-shaped and corresponds substantially to the shape of the space between two teeth of the gear to be operated upon, and its mounting end is turned cylindrical to fit a split bore 101 in the bar 99. A clamp screw 101a operatively engaging opposite sides of the split portion is provided to clamp the lug in the angularly adjusted position required, that is, slanted for helicals and straight for spur-gears.

The bar 99 is actuated rectilinearly by the piston 98 of the power cylinder 97 by means of a tie-bar 102 threaded to the end of the piston rod and adjustably clamped as by a set screw 103 to the bar 99. A compression spring 104 contained within the housing cap 96a reacts against the piston and tends normally to retract the piston and its connected bar 99 to the position indicated in Fig. 7. Fluid pressure cyclically admitted to the power cylinder on the other side of the piston tends to advance the piston and its connected bar 99. As shown clearly in Fig. 7, the piston rod 98 of the power cylinder 97 also projects rearwardly and is threaded to receive an adjustable stop-collar 105, which operates when the power cylinder is activated to advance the slide bar 99, to engage a pivoted lever 106 at the preset limit of its stroke. The latter lever is positioned to actuate limit switch 2LS that is mounted at the side of the pivoted housing 96. The switch-actuating lever 106 is pivotally mounted upon a stud 107 that is carried by the cylinder cap 96b. The stud 107 projects rearwardly and terminates in an end face 108 which lies in a plane substantially radial to the housing pivot 95. The electrically operated solenoid A that is carried by the extension 92b is positioned so that its armature 109 is caused to abut the inclined end face of the stud 107 and to urge the housing assembly 96—99 clockwise about the pivot point 95. This movement of the housing causes the tooth-engaging lug 100 to enter the space between two teeth of the gear that may be mounted on the work spindle, after which forward movement of the bar 99 (toward the left in Fig. 6) advances the gear (which is unclamped) one station. When the solenoid A is de-energized the force holding the lug 100 engaged with the gear is released, and the housing assembly 96 and slide bar 99 move counterclockwise about the pivot point 95 under the action of a compression spring 110 interposed between the housing 96 and bracket 92, and the tooth-engaging lug 100 moves out of the tooth space in preparation for a succeeding bar-retracting movement and to allow the index-correcting means previously described to perform its function of precision-locating and zeroizing the tooth space, the flanks and trough of which are to be treated by the inductor. The hydraulic and electrical controls will be explained later but for the present it will suffice to mention that when solenoid A is energized the lug 100 is moved into operative position with the gear. At this time the abutment screw 111 engages limit switch 1LS and pressure fluid is admitted to the power cylinder 97 and advances the bar 99 against the action of spring 104. At the end of the index stroke, determined by the nut 105, the lever 106 is actuated to operate limit switch 2LS. The latter de-energizes solenoid A and the index bar moves out under spring pressure.

In the full-line position of the parts shown in Fig. 6, the indexing mechanism has completed the indexing operation on a relatively large gear W, whereas in the broken-line position the indexing mechanism has completed the indexing operation upon a relatively small gear W1. The changeover from a large to a small gear is readily effected by loosening the clamp nut 94 and adjusting the bracket 92 and the parts carried thereby about the pivot 91, and reclamping the bracket when the index arm 99 lies approximately tangent to the teeth of the gear. Helical gears are indexed in the same manner except that the lug 100, especially if it is wedge-shaped, is loosened from its mounting in the bar 99 and revolved until it fits the slant of the teeth of the helical gears.

*Hydraulic system (Figs. 1, 2, 3, and 16 to 19, inclusive)*

Figure 19:
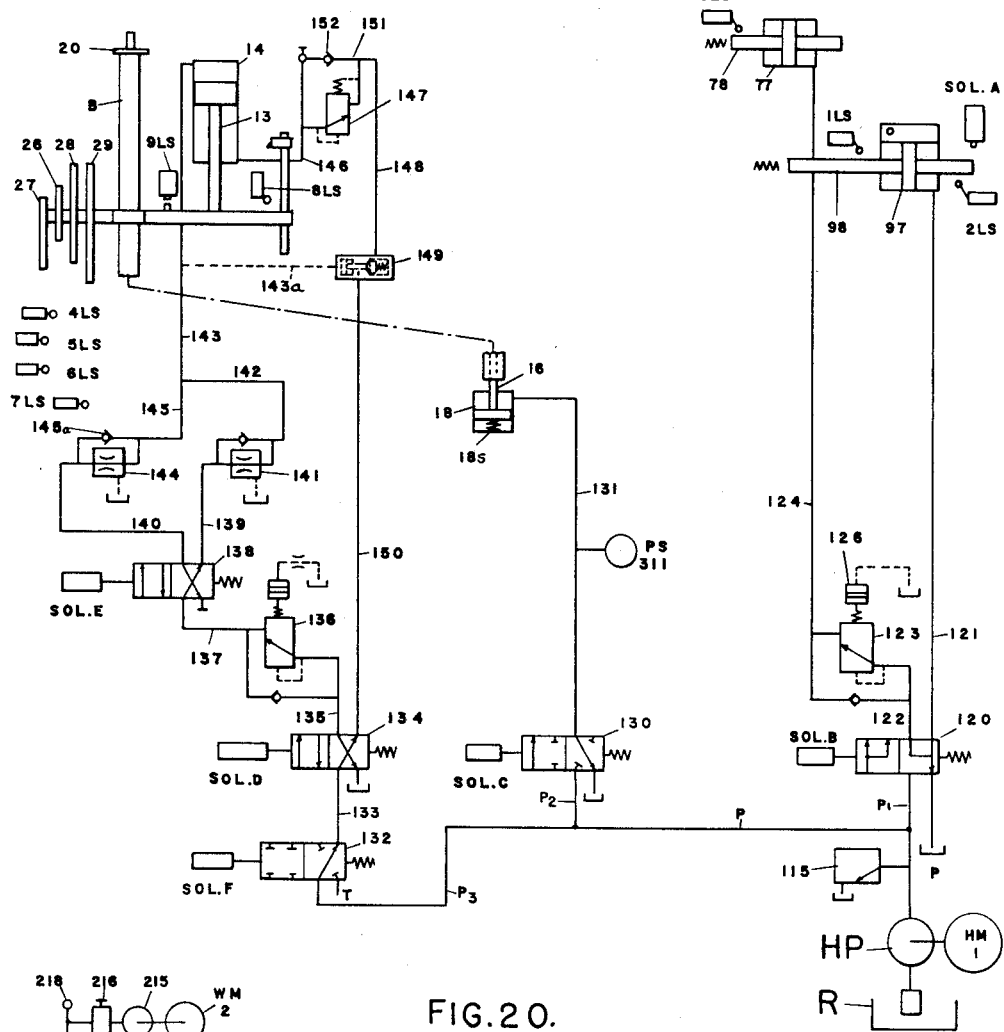
Fig. 19 is a schematic diagram of a fluid system provided for actuating the work spindle, work-clamping means, and the work-indexing and index-correcting means of the machine.
Figure 20:
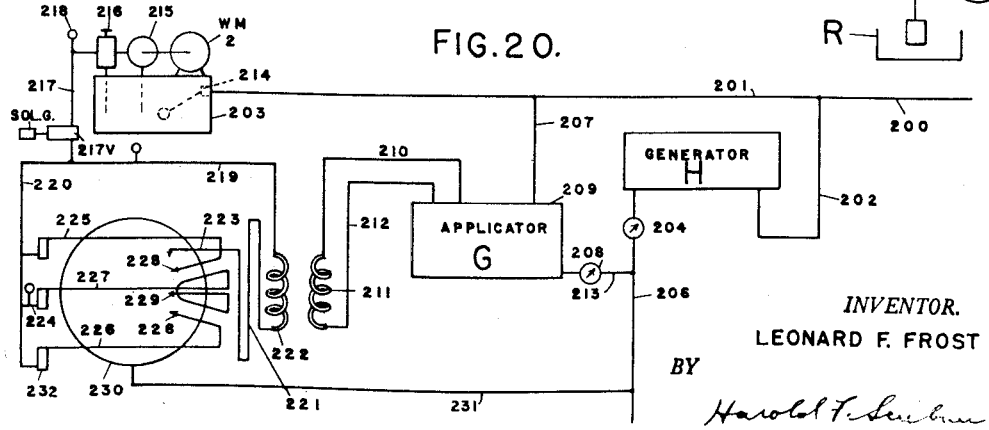
Fig. 20 is a schematic diagram of a fluid system provided for cooling the inductor and portions of the electrical components of the R-F generating circuits as well as the system provided to quench the work after heating to effect the hardening operation.

Portions of the hydraulic system have been explained above in connection with their intimately related devices and the system as a whole is illustrated diagrammatically in Fig. 19. Certain of the valves and controlling instrumentalities are illustrated structurally in Figs. 16 to 18. With reference more particularly to Fig. 19, the character HM represents a motor connected to drive a pump HP that receives hydraulic fluid, preferably oil, from a reservoir R and delivers it to a forward pressure line P. The forward pressure line embodies a high-pressure relief valve 115 set to bypass fluid when a preselected pressure is exceeded. The line P branches into three lines P1, P2 and P3, line P3 being connected to the work-traversing cylinder 14, line P2 to the work-clamping cylinder 18, and line P1 to the work-indexing and index-correcting cylinders 97 and 77 respectively.

*Work-indexing and index-correcting circuit*

The line P1 first enters a solenoid-operated four-way valve 120 which if shifted to the right in Fig. 19 by energization of solenoid B directs pressure fluid into lines 121 and 122. Line 121 connects directly with the back end of the index cylinder 97 causing the piston thereof to move forward on the indexing stroke. Line 122 connects with a time-delay valve 123 and thence via line 124 to the back end of the index-correcting power-cylinder 77 to cause its piston 78 to move forward and zero the tooth space. The purpose of the time-delay valve 123 is to delay the response of the index-correcting mechanism until the rough indexing of the work by the power cylinder 97 has been completed. The time-delay valve may form part of the valve 120 or may be a separate unit and includes a spring-loaded hollow piston element 125 that is actuated by the forward pressure in a direction against the spring until the operating port 124a is opened to forward pressure. The rate at which the valve piston moves to open position is controlled by adjustably regulating the rate of escapement of fluid from behind the piston 125 as by a needle valve 126 (Fig. 18). When the main valve 120 is shifted to drain, fluid in line 124 bypasses through a check valve 127 to line 122 thence via valve 120 to the reservoir. Fluid returning from index cylinder 97 passes through valve 120 to the reservoir also.

*Work-clamping circuit*

The forward-pressure branch line P2 connects with a solenoid-operated valve 130 and thence by line 131 to the upper end of the work-clamping cylinder 18. This line 131 embodies a pressure switch PS311 electrically connected in the control circuit of solenoid B to de-energize the latter after the work is clamped and which functions to render other circuits inoperative unless the workpiece is clamped and sufficient pressure exists in the hydraulic system. The valve 130 is actuated to work-clamping position by solenoid C and to work-unclamped position (shown in Fig. 19) by spring pressure.

*Work-traversing circuit*

The third branch-pressure line P3 connects with an On-Off valve 132 which is operated by solenoid F and thence via line 133 to a direction-control selector-valve 134 which is operated by solenoid D. Solenoid D of valve 134 is energized by pressure switch PS after the work is clamped and when so energized direction valve 134 is moved to the right from the position represented in Fig. 19 and pressure fluid is directed from the valve through line 135 to a time-delay valve 136 and thence after a regulatable time interval the pressure fluid is directed through line 137 to a rate-selector valve 138. The rate-selector valve is operated by solenoid E and in the position shown in Fig. 19 pressure is directed through line 139 to a rate-control valve 141 which is manually set to effect work traverse at an entering-feed rate (relatively fast). Fluid passing the valve 141 flows via lines 142 and 143 to the upper end of the work-traversing power-cylinder 14 and the work spindle B is caused to move downwardly at a relatively fast rate suitable for the entering phase of the work. Shortly thereafter, solenoid E may be energized (determined by the positioning of trip dog 26 and 4LS), and the valve 138 is shifted to the right from the position indicated in Fig. 19, whereupon pressure fluid is cut off from rate-restrictor valve 141 and is passed through rate-restrictor valve 144 via line 140 and thence via line 145 to the cylinder line 143. The restrictor valve or rate control valve 144 is hand set to produce a relatively slow rate of spindle movement such as would be suitable for heating heavier sections of the work. Back flow through the nonoperating valve 141 or 144 is blocked at the selector valve 138.

During the downward movement of the piston in the feed cylinder 14, oil is expelled from the lower end of the cylinder through line 146 and a pressure-relief valve 147. From valve 147 fluid flows through line 148 and a pilot-operated check valve 149 (which responds to pressure in the forward line 143 through line 143a) and through to the reservoir via line 150 and reversing valve 134. At the end of the down-stroke, limit switch 8LS is actuated and solenoids D and E are de-energized and their respective valves 134 and 138 move to their normal positions by spring pressure. In their normal positions fluid pressure is cut off from the upper end of the feed cylinder 14 and check valve 149 closes. However, the shifting of direction control valve 134 to normal position connects pressure line 133 to line 150 and check valve 149 opens to pass pressure fluid to the lower end of the feed cylinder 14 via line 151, check valve 152 and line 146 and the piston thereof and its connected work spindle B moves up. Upward movement stops when the piston reaches the end of the cylinder. Oil discharged from the upper end of the feed cylinder 14 passes back to the reservoir through lines 143, 145, check valve 145a, line 140, and valve 138.

As the work spindle B reaches its upper extreme position limit switch 9LS (Fig. 4) is actuated to de-energize solenoid C of valve 130 and the latter shifts to normal position wherein oil from the top of the clamp cylinder 18 is directed to the reservoir. A spring 17 in the power cylinder actuates the draw bolt 16 to work-released position.

*Apparatus-cooling and work-quench systems*
*(Figs. 1, 2, 3, 9, 10, and 20)*

Unless the composition of the metals on which a hard case is to be developed is of the air-hardened or air-quenched variety hardening of the workpieces is usually effected by subjecting the heat-treated area to an immediate quenching operation using water or in some instances oil as the quench medium. However, inasmuch as a water quench is most frequently adopted and since a water system lends itself readily adaptable to cooling portions of the high-frequency current-generating apparatus, such a system has been disclosed herein. Referring more particularly to the circuit diagram illustrated in Fig. 20, the line 200 represents a source of water, for example city water, which branches into two lines 201 and 202. Line 201 delivers directly to a float-controlled tank or reservoir 203 of the work-quenching system, and line 202 leads into the power section H of the high-frequency generator and supplies a cooling medium for the high-voltage transformer and oscillator valve. The drain or waste line 206 leads away from the power section H through a combined water flow regulator and switch 204.

A second branch line 207 leading from the line 201 supplies cooling water to the applicator section G for cooling the tank circuit. A water filter combination flow regulator and switch 208 is installed in the return line 213 for regulatory purposes. At the applicator or tank circuit G the cooling medium is also fed through a flexible line 210 through the primary winding 211 of the output transformer, through flexible line 212 to the applicator and thence to line 213.

The tank or reservoir 203 of the quenching circuit is maintained filled to the desired level through the action of the float-controlled valve 214. An electric motor-driven pump 215 mounted on top of the tank draws fluid from the tank and discharges it through a relief valve 216 to a line 217 in which pressure gage 218 is installed. Water line 217 preferably embodies a shutoff valve controlled by solenoid G, operative to shut off the water at the end of the cycle. Pressure line 217 branches into two lines 219 and 220, the former supplies cooling medium to the secondary winding 222 of the output transformer, and series connected cooling tube 221 located at the rear of the intensifier mounting plate of the housing 60. The discharge from these coils passes to a work-quench nozzle 223 which directs the stream of cooling medium over the work for general cooling purposes. The other branch line 220, branches into three lines, 225, 226, and 227. The first two of these lines supply quenching medium to the side jets 228 located as to direct the quenching medium against the side surfaces heated by the inductor C, and the third line 227 receiving flow through a combination flow-regulator and switch 224 supplies cooling medium to the interior of the inductor C and the discharge therefrom is directed to the root of the tooth through jet 229. Independent flow regulators 232 may be embodied in each of jet lines 225 and 226 for determining not alone that there is fluid flowing but that the quench medium is flowing in sufficient quantity for the quenching operation. The quenching agent that cascades downwardly over the heat-treated area of the work is caught in the drain basin 230 and led off through line 231 to the sewer or waste line 206.

*High-frequency current-generating system (Fig. 24)*

The high-frequency circuit is illustrated in the block diagram Fig. 24 and portions of the control in Figs. 21, 22, and 23. The 440 v., 60 c., 3 ph., A.C. power is brought to the apparatus through a wall-mounted switch 162 and is connected to the line side of a magnetic-circuit breaker 163. This switch is initially manually closed but is held closed by a coil 163a that normally receives reduced current voltage from an auxiliary transformer 320. A safety trip switch 163b is provided to ground the coil so as to cause the circuit-breaker to open and cut off all power to the machine. Ahead of the circuit breaker a 440 v. supply is taken off to feed through a pair of fuses 163c to the auxiliary transformer 320 provided to reduce the voltage to 115 v. suitable for control purposes. After passing the circuit breaker 163 the 440 voltage is supplied to voltage regulator 160 that is designed to maintain the voltage supplied to the R—F generator H and to the machine proper substantially constant thus to insure uniformity in output voltage whereby to maintain consistently uniform hardness depth and pattern in the work. The regulated 440 v. current is supplied through lines L1, L2, L3 to motor contactors M1 and M2 for motors #1 and #2 and to a transformer 164 at the control panel of the machine which reduces the current to 115 v. suitable for control purposes. (Fig. 21.)

Another set of 440 v. power lines k lead from the voltage regulator through a radio-frequency suppressor, installed to prevent R-F current feed back, located in the generator section H. From the suppressor the supply leads to the gear-hardening machine where it is connected with the line side of a power-change switch 161. If the power switch 161 is open, resistances 161a are connected into the supply lines, whereas if the switch is closed the resistances are shorted out and full voltage is directed back to the generator section H through lines 161b. The operation of the power switch is controlled by the coil 161c and limit switches 6LS and 4LS whose operations are explained in connection with Fig. 21.

On entering the generator section H the power lines 161b connect with one side of contactor relay 205a. Relay 205a is magnetically operated and controlled by limit switches 5LS and 7LS in the main control circuit (Fig. 21) to turn the R-F power on or off during the operating cycle of the machine. On the generator side of the relay 205a the 440 v. current is supplied to the primary of a transformer 205b which steps up the voltage to 2800 v. A.C. between phases. This high voltage is then directed through a bank of rectifying tubes, indicated at 205c which convert the A.C. to 6500 v. D.C. The high-voltage direct current is then fed to oil-immersed oscillator tubes 209a in the oscillatory section G, which together with water-cooled variable-inductance coils 209b, and oscillatory-circuit capacitor, forms the source of the radio-frequency power. To suit the impedance of a given inductor and to render it possible for that inductor to utilize the R-F power available, the output transformer 211, 222 is provided. The transformers 211, 222 are connected to the oscillatory-circuit output with water-cooled flexible leads and to the inductor C. Auxiliary circuits within the generator section H and the oscillatory section G, not illustrated on the drawing, receive 115 v. A.C., single-phase power from an auxiliary transformer 205d located within the generator cabinet.

The line diagram Fig. 23 illustrates schematically the auxiliary circuit provided to operate the main circuit breaker 163. In such a circuit the holding coil of the circuit breaker is connected in series with normally closed door- and panel-switches 10LS and 11LS and with a master stop-switch 321. As above explained this circuit is supplied with 115 v. current from the auxiliary step-down transformer 320 which is connected across one phase of the main supply lines ahead of the circuit breaker 163. Hence if a door is left open the machine cannot be operated, or if any switch-controlled door is opened during a cycle the machine as a whole shuts down. The same result follows should the operator ever find it necessary to press the master knock-off button 321. The power-change switch 161 on the electrical panel in the machine is utilized, as hereinbefore explained, to effect a change in the heat induced into the work by the inductor, and relay 205a in the generator section is utilized to turn the R-F power on or off without effecting operation of the pump motors #1 and #2 or the operation of other mechanical or electrically operated elements of the machine.

*Electrical control circuitry (Figs. 21, 22, 23 and 24)*

In the instant embodiment of the invention 440 v., 3 ph., A.C. power to operate the machine and to control the operational cycle thereof is taken from the voltage regulator 160 through lines L1, L2, L3 and connected with contactor switch M1 and M2 of the hydraulic motor #1 and the water-pump motor #2. A supply is taken off one phase in the gear-hardening machine and connected to the primary of the auxiliary transformer 164 that reduces the voltage to 115 v., single-phase, A.C., 60 cycle suitable for operating the control relays and solenoids of the machine.

The control circuitry is illustrated most clearly in Fig. 21 in which it will be seen that one side 300 of the 115 v. circuit supplied by the transformer is fused as at 301. The other side of the circuit is designated 302. The symbols M1 and M2 represent the coils of the motor contactor switches for motors #1 and #2 and include in their circuits normally closed Stop switches 303 and 304 and normally open Start switches 305 and 306. Each of the latter switches have holding circuits including contacts M1 and M2 that are closed when the respective coils M1 and M2 are energized.

Automatic cycle

To cause the machine to operate automatically the cycle switch 307 is turned to Auto and the Cycle Start button 308 is pressed. Current from line 300 feeds through the button 308 and energizes the clutch coil 309 of a cycle counter and conditions the latter for counting the number of passes of the work past the intensifier C. Energization of the counter-clutch coil effects closing of a holding circuit around the Start button and closes a similar holding circuit for the coil of relay 1CR. Relay 1CR is energized initially upon the pressing of the Start button 308. When the relay 1CR is energized the contacts 1CR in line 310, which forms part of the circuit for sol. A on the index bar, closes and the sol. A is energized to move the index bar 99 to indexing position. Also contacts 1CR in line 410 connected with solenoid G of the water valve 217V is energized and the valve opens. As the index bar reaches its operating position, the lug 111 thereon engages and actuates limit switch 1LS to complete the circuit to relay 2CR. When 2CR is energized, switch 2CR in the circuit of sol. B closes and sol. B (Figs. 16 and 19) shifts valve 120 to direct oil under pressure to the index cylinder 97. Simultaneously oil is directed to the time-delay valve 123 in the index-correcting circuit and after a predetermined time sufficient to complete the rough-indexing operation and to allow a building up of pressure, pressure oil passes the valve 123 and is directed to the index-correcting and gear-centralizing cylinder 77 to advance the centering pin 70 (Fig. 9) into the tooth space. At the completion of the forward indexing movement of the index bar 99, limit switch 2LS in the circuit of sol. A that was holding the index bar engaged with the gear, opens thus de-energizing the solenoid and the bar retracts from the gear by spring pressure.

As the gear-centering lug or pin 70 reaches its final position the upper end 76 of its supporting lever 72 actuates limit switch 3LS and closing of the latter energizes relay 3CR. Relay 3CR closes contacts 3CR in the circuit of valve sol. C and energization of the latter shifts clamp valve 130 (Figs. 16 and 19), whereupon pressure fluid in line P2 is directed to the upperside of the work-clamp cylinder 18 and the previously indexed and centered work becomes firmly clamped to the spindle in its new position. Relay 3CR also opens contacts 3CR in the circuit of sol. A of the index arm to keep the latter de-energized while the work is clamped.

When the pressure in work-clamp cylinder 18 builds up sufficiently to operate pressure switch 311, the latter closes and energizes relay 4CR which opens contacts 4CR in the circuit of relay 2CR to de-energize sol. B of the index and locating valve 120 and the pistons of the respective power cylinders retract by spring pressure. Simultaneously the normal open contact 4CR in the circuit of valve sol. D closes and the sol. D is energized and shafts direction-control valve 134 to feed-down position. Pressure fluid is then directed through valves 136, 138, 141 to the upper end of feed cylinder 14 and the work spindle moves downward at an entering-feed rate.

During the descent of the work spindle B, trip bar 27 carried by the crosshead B1 (Fig. 4) engages and closes limit switch 5LS of an auxiliary circuit to energize the RF relay 205a in the generator H and turns the RF power on, provided adequate cooling liquid is circulating through the intensifier to maintain Flow SW 312 closed and provided also that proper operating pressure exists in the hydraulic system to maintain pressure switch 311 closed and relay 4CR energized.

The work continues its downward travel at the rate determined by rate valve 141, until, if a change in rate is desired, trip bar 26 engages and holds limit switch 4LS in the circuit of rate-valve sol. E, closed. If the trip bar 26 is set to produce a change in feed rate the solenoid valve 138 will be shifted at the selected point in the travel of the work and pressure fluid will be directed through rate valve 144 instead of valve 141. Fast-Slow selector switch 313 is provided in the circuit of sol. E and limit switch 4LS so that the entering rate may be manually selected and later, if desired, changed to the other rate.

Power change

To effect a change in the RF power supplied to the intensifier C, use is made of the power switch 161. Normally the switch contacts are open and the resistances 161a are in the line voltage circuit and a reduced voltage is supplied through lines 161b (Fig. 24) to the generator H. To obtain increased heat after the work is entered, the selector switch 314 marked Heat, Auto, Off, Test, in Fig. 21 is turned to the position shown to feed current from line 300 through the switch 314 to normally open limit switch 6LS in the circuit to the coil 161c of the power switch 161. Trip bar 28 carried by the work-spindle carriage B is set to actuate limit switch 6LS to its closed position at the desired point in the travel of the work whereupon current through the switch 6LS is conducted through normally closed switch 4LS to the coil of the power switch 161. This energizes the coil, the switch contacts close and the resistances 161a are shorted out of the circuit so that the full voltage is fed to the generator section H. The closing of the power switch 161 completes a holding circuit around the limit switch 6LS and the feed continues with the inductor operating at the higher voltage. Trip bar 28 may be set to operate 6LS to increase the power either before or after the intensifier C enters the work. If a reduction of power is wanted at the time the feed rate is changed, trip bar 26 is set to actuate limit switch 4LS, which contains a pair of normally closed contacts 4LS connected in the circuit to the coil of power-switch 161, and opens this circuit. The switch 161 opens thus restoring the resistances 161a to the generator circuit and work travel continues with reduced power at the intensifier C.

As the work nears the end of its downward stroke trip bar 29 engages and opens limit switch 7LS in the circuit to the coil of main Off-On switch 205a (in the generator H) and de-energizes the coil so that the switch 205a opens to cut off the high-voltage power supply.

At the end of the preset stroke, determined by the setting of latch dog 32 on the graduated guide-bar 10a (Figs. 4 and 5), the latch dog 32 engages and closes limit switch 8LS to energize relay 7CR. When 7CR becomes energized normally closed contacts 7CR in the circuits of valve solenoids D and E open and de-energize the solenoids. The valves 134 and 138 controlled by solenoids D and E thereupon shift to their opposite positions wherein pressure fluid is directed to the lower end of the power cylinder 14 and the discharge from the upper end is around rate-control valve 144, to line 140, through valve 138 to lines 137 and 135 and through valve 134 to the tank. Relay 7CR when energized also opens normally closed contacts 7CR around limit switch 9LS and closes normally open contacts 7CR in the counter-ratchet circuit to condition the ratchet for counting. With valves shifted to return positions and the circuitry to the counter-ratchet coil completed through normally closed limit switch 9LS the work spindle B and the workpiece move upwardly. As the spindle carriage nears the end of the upward stroke the abutment screw 33 (Fig. 4) engages and opens limit switch 9LS in the counter-ratchet circuit and the counter registers one stroke. Also another pair of contacts in the switch 9LS open to open the circuit to relay 3CR which in turn opens contact 3CR in the solenoid circuit of clamp valve 130 (Fig. 19). The clamp valve accordingly shifts to drain and the spring in the power cylinder 18 actuates the piston to work-unclamped position. De-energization of relay 3CR also effects closing of contacts 3CR in the circuit of the index-bar sol. A and the latter again swings the index bar 99 in to effect position with the teeth of the gear.

As pressure is relieved in the line 131 to the clamp cylinder 18, pressure switch 311 opens and de-energizes relay 4CR which effects closing of normally closed contacts 4CR in the circuit of relay 2CR, thus restoring this circuit for index-valve operation when the index bar engages limit switch 1LS. As the index-bar abutment 111 engages 1LS the normally closed contacts thereof in the circuit of relay 7CR open thus de-energizing relay 7CR and allowing contacts 7CR to close around 9LS in the circuit of relay 3CR. As above explained the closing of 1LS by the index bar initiates the rough-indexing cycle and at the conclusion thereof the gear is accurately centralized by the locating pin 70 and thereafter relay 3CR is energized to initiate a repeat work-clamping operation. In this manner the hardening cycle of operations is repeated and will continue to repeat until the strokes registered by the counter-ratchet mechanism total the tooth spaces of the work. On the last of such strokes the counter contacts, in the holding circuit around the Cycle Start Switch 308 and in the circuit of relay 1CR, open and machine operations stop with the quench water shut off.

Single-stroke operation (Fig. 21)

To cause the machine to operate through a single stroke only, the operator loads the work on the spindle and positions it manually by operating the locating pin 70 by hand. The cycle-selector switch 307 is turned to single which cuts out the counter-clutch and counter-ratchet coils and energizes relay 5CR direct from line 300. The two normally open contacts 5CR in the clamp circuit (sol. C) close to energize sol. C to clamp the work. After the work is clamped the operator releases the locating pin 70. The normally closed contact 5CR at the return side of sol. A, sol. B, relays 2CR and 3CR, opens thus rendering the index-arm and the indexing- and locating-power cylinders 97 and 77 inoperative. Also the normally closed contact 5CR in the holding circuit for relay 3CR opens so that limit switch 9LS will not affect the relay 3CR. The normally open contact 5CR in the holding circuit (line 316, Fig. 21) for relay 1CR closes to put 9LS and 7CR in the holding circuit for relay 1CR.

When the work is clamped pressure builds up and closes pressure switch 311 but relay 4CR does not respond because normally closed contacts 5CR in the circuit have been opened by relay 5CR in response to the turning of Cycle switch 309 to single.

The operator then presses the Cycle Start button 308 to energize relay 1CR and contacts 1CR in the holding circuit 316, close. Also contact 1CR in the circuit to relay 4CR closes to energize relay 4CR and the latter closes contact 4CR in the feed circuit (sol. D). The valve 134 thereupon shifts and the downfeed starts. The RF controls, rate-change controls, power-change controls, length of stroke, power cut-out controls, and reverse-travel controls operate as previously explained and at the end of the return stroke the dog 33 carried by the spindle crosshead B1 actuates switch 9LS and opens the circuit to relay 1CR. When relay 1CR is de-energized contact 1CR in the circuit of relay 4CR opens and as relay 4CR controls portions of the circuit of valve solenoids D and E these circuits open and the feed will not repeat unless or until the Cycle Start button 308 is again depressed. When the Cycle Start button 308 is depressed the holding circuit for relay 7CR, which circuit is created in part by the second pair of contacts of the button 308, is open and the normally closed contact 7CR in the holding circuit 316 around 9LS closes so that the starting relay 1CR will function upon pressing the Start button 308.

Jog feed (Fig. 19)

In setting up operations it frequently is desirable to move and stop movement of the work and to that end a jogging circuit has been incorporated. The operator loads and positions the work, as before, by hand. He then turns the pushbutton-selector switch 317 marked Auto-Feed-Jog on the drawing, to Jog position which opens the control circuit to the high-voltage relay 205c and closes the circuit to valve sol. F. Valve 132 which is actuated by sol. F shifts to block the flow of pressure fluid to line 133 and feed cylinder 14. When the switch button 317 is depressed relay 6CR is energized and effects closing of normally open contact 6CR in a bridging circuit from sol. A (index bar) to return line 302 and the index bar moves in. Indexing, locating and work clamping follow as before. Also the energization of relay 6CR effects the opening of the normally closed contacts 6CR in the circuit to sol. F and the latter de-energizes allowing valve 132 to move by spring pressure to open position and direct pressure fluid to the feed valves. The feed-valve solenoids D and E operate as before explained, but if valve solenoid F is energized the oil is blocked and the work spindle will not move. Thus, turning of the Feed, Auto, Jog selector switch 317 energizes the blocking solenoid F, depressing of the same switch de-energizes the blocking solenoid. Accordingly the operator can inch the work through a cycle by repeatedly pressing the jog switch and complete a cycle by holding the jog switch depressed. It will be observed that when the operator releases the jog button 317, the relay 6CR de-energizes and opens the bridging circuit of relay 2CR which controls the indexing sequence, and he should, therefore, hold the jog button depressed until indexing, locating, and clamping have been completed.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. The method of surface hardening the flanks and troughs of gear teeth or like articles by means of high-frequency induction heating which consists in inserting at the location normally occupied by a working inductor a relatively fixed dummy inductor into the space between a pair of gear teeth of a revolvable gear and into contact with the adjacent flanks and trough surface thereof thereby to locate the gear tooth space angularly with relation to the dummy inductor, holding the gear tooth space in such angular position and inserting a relatively fixed locating pin into the said tooth space and into engagement with the tooth flanks at one side of the dummy inductor, then removing the dummy inductor from the tooth space and replacing same with a relatively fixed working inductor of slightly smaller sectional area so that an air gap of a known dimension exists between the sides and end faces of the working inductor and the flank and trough surfaces of the partially surrounding gear teeth, traversing said working inductor relative to the gear in the direction of the length of the tooth space and simultaneously quenching the work at the trailing side thereof to effect the progressive hardening of adjacent flanks and trough of the pair of teeth simultaneously, withdrawing the locating pin, indexing the gear to present another tooth space to the general location of the locating pin, inserting the locating pin in the newly presented tooth space thereby to establish proper spaced relation of the flanks and trough surfaces defining the new space to be traversed by the working inductor, and repeating the traversing heating and quenching, and indexing and locating operations until all of the teeth of the gear have been hardened.

2. The method of treating flanks and trough surfaces of gear teeth with induced current so as to obtain consistently uniform heat distribution on the tooth flanks and troughs which consists in engaging the flanks of a pair of adjacent teeth of a freely revolvable gear with a relatively fixed dummy inductor whereby to zero therewith the space between said pair of teeth, holding the gear in said zeroed position while inserting a locating pin into the said space and into contact wth the tooth flanks, removing the dummy inductor and replacing same with a working inductor of slightly smaller sectional area so that an air gap exists between the margins thereof and the zeroed gear-teeth flanks and trough surfaces, traversing the gear relative to the working inductor in the direction of the said space to effect progressive treatment of the flank and trough surfaces bounding said space, removing the locating pin and revolving the gear to bring the tooth space between an untreated pair of teeth approximately into treating position, zeroing the flanks of the untreated teeth with the working inductor by inserting the locating pin into the space between and into contact with the flank surfaces, and repeating the traversing of the gear past the working inductor.

3. High-frequency induction-heating apparatus for treating the profiles of gear teeth comprising a main frame member, a non-rotatable work spindle mounted for axial movement in the frame adapted to mount a gear to be treated, a source of high-frequency current including an inductor element adapted to effect heating of the adjacent tooth flanks and trough surfaces defining the said tooth spaces, means for shifting the work spindle axially thereby to effect relative movement between the inductor and the gear in a direction longitudinally of the tooth space to effect progressive heating of the flanks and trough surface, indexing means operative on the gear at the conclusion of said relative traverse movement to adjust the gear angularly relative to the work spindle whereby to present a succeeding tooth space in operative relation with said inductor, said gear indexing means including a tangentially shiftable member operative cyclically to engage the periphery of the gear and to advance same angularly a unit distance conforming approximately to the circular pitch of the gear and a radially movable element operative cyclically to enter the tooth space next to be traversed by the inductor for zeroing the flanks and trough surfaces defining said next space with the said inductor, means for clamping the gear to the work spindle in said last-mentioned zeroed position prior to the initiation of said relative movement between the gear and the inductor, and control means responsive to the said relative movement between the inductor and gear to initiate said gear-indexing traverse movement and responsive to said gear indexing movement to initiate a repeat cycle of relative traverse movement of the gear and the inductor.

4. In high-frequency induction-heating gear-hardening apparatus, means for supporting the gear to be treated comprising a movable work spindle, an inductor element shaped to fit into the space between two adjacent teeth of the gear to effect heating of the opposed flanks and trough surfaces thereof simultaneously, a source of high-frequency current connected with said inductor, means for shifting said work spindle axially to effect movement of the gear past the inductor and the progressive heating of the adjacent flanks and trough surfaces bounding the tooth space occupied by the inductor, said means for shifting the work spindle including rate varying means, and means responsive to the movement of the work spindle and effective upon said rate varying means to effect a change in the rate of movement during the work-heating operation and thereby effect a change in the heat pattern induced into the workpiece by said inductor.

5. The combination of claim 4 in which said source of high-frequency current includes means to vary the unit value of the current in the inductor circuit and thereby the effectiveness of the inductor, and electively available means responsive to the movement of the work spindle to change the unit value of the high-frequency current supplied to the inductor during movement of the gear past the inductor.

6. In a machine for hardening the teeth of helical gears, a main frame member, a work spindle journaled in the frame for rotary and axial movement, said spindle including means for mounting a gear thereon for treatment, a support carried by said frame, work-heating means carried by said support in normally fixed relations to the axis of said spindle, said work-heating means including at least one member adapted to enter the space between two adjacent teeth of the gear and to heat the wall surfaces defining said space, means operatively connected with the work spindle for moving the spindle axially, and means responsive to axial movement of the spindle to actuate the spindle simultaneously angularly so that said heating element is caused to track the space between said pair of teeth of the helical gear, said last named means including a sine-bar mechanism comprising a disc element mounted for adjustment about an axis normal to the axis of the spindle, guide means extending across the diameter of the said disc, a rectilinearly movable bar member and a follower roll carried by the bar engageable with said guide means, and means operatively connecting said bar member with said spindle so that rectilinear movement imparted to said bar by said follower roll and guide means when the guide means is positioned out of parallelism with the axis of the spindle actuates the said spindle angularly.

7. The combination of claim 6 in which the rectilinearly movable bar member and its follower roll is mounted for bodily movement axially with said spindle and in which the said disc element and its follower-roll guide-means is relatively stationary.

References Cited in the file of this patent

UNITED STATES PATENTS

| | | |
|---|---|---|
| 1,768,159 | Shorter et al. | June 24, 1930 |
| 2,011,488 | Swahnberg | Aug. 13, 1935 |
| 2,132,110 | Holler | Oct. 4, 1938 |
| 2,338,496 | Denneen et al. | Jan. 4, 1944 |
| 2,440,716 | Gilson | May 4, 1948 |
| 2,461,734 | Hartley et al. | Feb. 15, 1949 |
| 2,564,906 | Kincaid et al. | Aug. 21, 1951 |
| 2,582,929 | Gridley | Jan. 15, 1952 |
| 2,598,694 | Herbenar | June 3, 1952 |
| 2,644,372 | Hamill | July 7, 1953 |

FOREIGN PATENTS

| | | |
|---|---|---|
| 622,126 | Germany | Nov. 21, 1935 |
| 448,241 | Great Britain | June 3, 1936 |
| 540,358 | Great Britain | Oct. 14, 1941 |
| 642,865 | Great Britain | Sept. 13, 1950 |
| 701,795 | Great Britain | Jan. 6, 1954 |